US006943970B2

(12) United States Patent
Takaishi et al.

(10) Patent No.: US 6,943,970 B2
(45) Date of Patent: Sep. 13, 2005

(54) POSITION DEMODULATING METHOD AND CIRCUIT OF DISK APPARATUS

(75) Inventors: Kazuhiko Takaishi, Kawasaki (JP); Takeyori Hara, Kawasaki (JP); Eiji Okamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 483 days.

(21) Appl. No.: 10/044,403

(22) Filed: Jan. 11, 2002

(65) Prior Publication Data

US 2003/0063404 A1 Apr. 3, 2003

(30) Foreign Application Priority Data

Sep. 6, 2001 (JP) ........................................ 2001-269871

(51) Int. Cl.⁷ .......................... G11B 20/06; G11B 20/08
(52) U.S. Cl. ............................ 360/29; 360/30; 360/75; 360/77.01; 360/78.01
(58) Field of Search ............................... 360/29–30, 75, 360/77.01, 78.01, 39, 55, 65, 77.02, 67–68; 329/315, 316–317, 345, 347; 332/106, 108, 117, 144, 149; 369/43

(56) References Cited

U.S. PATENT DOCUMENTS

| | | | |
|---|---|---|---|
| 5,381,281 A | | 1/1995 | Shrinkle et al. |
| 5,541,785 A | * | 7/1996 | Sasamoto et al. ......... 360/77.05 |
| 5,576,910 A | | 11/1996 | Romano et al. |
| 5,726,823 A | | 3/1998 | Kisaka et al. |
| 5,907,449 A | * | 5/1999 | Itou et al. ................. 360/78.04 |
| 6,034,835 A | | 3/2000 | Serrano |
| 6,078,445 A | | 6/2000 | Serrano et al. |
| 6,118,615 A | * | 9/2000 | Takaishi ................... 360/77.02 |
| 6,166,871 A | * | 12/2000 | Takaishi ....................... 360/53 |
| 6,172,839 B1 | | 1/2001 | Ahn |
| 6,646,824 B1 | * | 11/2003 | Takaishi et al. ........... 360/77.02 |

FOREIGN PATENT DOCUMENTS

| | | | |
|---|---|---|---|
| JP | 06-243608 | * | 9/1994 |
| JP | 08-195044 | * | 7/1996 |
| JP | 2000-030386 | * | 1/2000 |

OTHER PUBLICATIONS

"Automatic Gain Control for Position Error Signal in a Disk file Digital Servo Control System", Aug. 1998, IBM Technical Disclosure Bulletin, vol.31, Issue No. 3, pp. 297–298.*
"Off Track Gain calibration of Position Error Signal", Jun. 1977, IBM Technical Disclosure Bulletin, vol. 20, Issue No. 1, pp. 349–350.*
Ishii et al., "High Density Servo Signal Detection for Accurate Head Positioning", Sep. 1987, IEEE Transactions on Magnetics, vol. MAG–23, No. 5, pp. 3684–3686.*
Shariatdoust et al., "An Integrating Servo Demodulator for Hard Disk Drives", May 1993, Proceedings of the IEEE Custom Integrated Circuits Conference, pp. 10.6.1–10.6.5.*

* cited by examiner

Primary Examiner—David Hudspeth
Assistant Examiner—Natalia Figueroa
(74) Attorney, Agent, or Firm—Greer, Burns & Crain, Ltd.

(57) ABSTRACT

Position information PosN and PosQ are compared and position information Pos1 and Pos2 in which influences of an error of a position sensitivity gain appear oppositely are calculated. Subsequently, a weight gain G1=M and a weight gain G2=(1−M) are obtained from the position information Pos1. A multiplication value obtained by multiplying the third position information Pos1 by the weight gain G1 and a multiplication value obtained by multiplying the fourth position information Pos2 by the weight gain G2 are added and synthesized, thereby calculating a decoded position.

14 Claims, 27 Drawing Sheets

PRIOR ART
FIG. 6

| SEGMENT | PosN | PosQ | Gray%2 | $|N| \geqq |Q|$ | CALCULATING EXPRESSION |
|---|---|---|---|---|---|
| 1 | − | − | 0 | 1 | Gray−PosQ−0.5 |
| 2 | − | − | 0 | 0 | Gray+PosN |
| 3 | + | − | 0 | 0 | Gray+PosN |
| 4 | + | − | 0 | 1 | Gray+PosQ+0.5 |
| 5 | + | + | 1 | 1 | Gray+PosQ−0.5 |
| 6 | + | + | 1 | 0 | Gray−PosN |
| 7 | − | + | 1 | 0 | Gray−PosN |
| 8 | − | + | 1 | 1 | Gray−PosQ+0.5 |

PRIOR ART
FIG. 7

| SEGMENT | PosN | PosQ | Gray%2 | $|N| \geq |Q|$ | CALCULATING EXPRESSION |
|---|---|---|---|---|---|
| 1 | − | − | 0 | 1 | Gray−PosQ−0.5+1 |
| 2 | − | − | 0 | 0 | Gray+PosN+1 |
| 3 | + | − | 0 | 0 | Gray+PosN−1 |
| 4 | + | − | 0 | 1 | Gray+PosQ+0.5−1 |
| 5 | + | + | 1 | 1 | Gray+PosQ−0.5+1 |
| 6 | + | + | 1 | 0 | Gray−PosN+1 |
| 7 | − | + | 1 | 0 | Gray−PosN−1 |
| 8 | − | + | 1 | 1 | Gray−PosQ+0.5−1 |

FIG. 25

| SEGMENT | N | Q | Gray%2 | \|N\|≧\|Q\| | Gray+Offset | Pos1 | Pos2 |
|---|---|---|---|---|---|---|---|
| 1 | − | − | 0 | 1 | Gray−0.5 | −PosQ | +PosN+0.5 |
| 2 | − | − | 0 | 0 | Gray | +PosN | −PosQ−0.5 |
| 3 | + | − | 0 | 0 | Gray | +PosN | +PosQ+0.5 |
| 4 | + | − | 0 | 1 | Gray+0.5 | +PosQ | +PosN−0.5 |
| 5 | + | + | 1 | 1 | Gray−0.5 | +PosQ | −PosN+0.5 |
| 6 | + | + | 1 | 0 | Gray | −PosN | +PosQ−0.5 |
| 7 | − | + | 1 | 0 | Gray | −PosN | −PosQ+0.5 |
| 8 | − | + | 1 | 1 | Gray+0.5 | −PosQ | −PosN−0.5 |

POSITION DEMODULATING METHOD AND CIRCUIT OF DISK APPARATUS

BACKGROUND OF THE INVENTION

1. Field of the Invention

The invention relates to position demodulating method and circuit of a disk apparatus, for demodulating a position of a head in order to position the head to a target position. More particularly, the invention relates to position demodulating method and circuit of a disk apparatus, for calculating a decoded position from a position signal of a disk which was read by a head.

2. Description of the Related Arts

A disk apparatus for reading a disk medium by a head comprises: a disk on which data is recorded; a motor for rotating the disk; the head for recording ad reproducing information on the disk; and an actuator for moving the head to a target position. As typical apparatuses, there are a magnetic disk apparatus known as a hard disk drive (HDD) and an optical disk apparatus known as a DVD-ROM or an MO.

In the magnetic disk apparatus, as shown in FIG. 1, position information 202 for detecting a position of a head has been recorded on a disk 200 at regular intervals in the circumferential direction from the inner rim to the outer rim. As shown in FIG. 2, the position information 202 comprises: a servo mark 204; a track number 206 using a gray code; an index 208; and offset information 210 including burst patterns corresponding to position signals PosA, PosB, PosC, and PosD. The present position of the head can be recognized by using the track number 206 and offset information 210 in the position information.

A read signal of the position information from the head has a signal waveform as shown in FIG. 3 and is inputted to a position detecting circuit. In the position detecting circuit, a servo mark signal 212 is detected, a start time of the position signal is recognized, the track number is extracted from a gray code signal 214, and position offset values are extracted from burst signals Ea, Eb, Ec, and Ed corresponding to the position signals PosA, PosB, PosC, and PosD and stored into a memory, respectively. The position detecting circuit is connected to an MCU (Main Control Unit) or a DSP (Digital Signal Processor). The MCU reads out the value from the memory and demodulates the present head position by calculations. The MCU calculates a value of a current which is supplied to an actuator in accordance with the present position. The calculated current value is set into a DAC. An output of the DAC is supplied to a current amplifier and a current is supplied to a motor (VCM) of the actuator. The MCU is connected to the outside of the apparatus via an HDC (Hard Disk Controller). Usually, a computer is provided for the outside of the apparatus and a command to record or reproduce the data is transmitted from the computer. The MCU analyzes the transmitted command and converts it into the actual position on the disk, thereby forming a target position and moving the actuator and the magnetic head to the target position.

According to a conventional position demodulating method, when the head reads out the burst patterns PosA, PosB, PosC, and PosD recorded in a zigzag shape on the magnetic disk as shown in FIG. 2 so as to have signal waveforms shown in FIG. 4, areas of the signals or areas of the absolute values are obtained by the position detecting circuit. Two position signals PosN and PosQ are calculated as follows by using the position signals PosA, PosB, PosC, and PosD detected from the four burst signals Ea, Eb, Ec, and Ed.

$$PosN = PosA - PosB$$

$$PosQ = PosC - PosD$$

FIG. 5 shows the position signals PosN and PosQ obtained by calculations. The position signal PosQ is arranged at a position where a phase is deviated from that of the position signal PosN by ¼ track. At this time, in each of the eight divided intervals, relations among the track numbers recorded on the medium, their detection errors, and the position signals PosN and PosQ are as shown in a table of FIG. 6. That is, the signal of the smaller absolute value between the position signals PosN and PosQ is used and the position is demodulated from the corresponding calculating expression. However, there is a case where a gray number (or track number) on the disk is erroneously read at a position near a switching point of the position signals PosN and PosQ. Therefore, if it is determined that the gray number was erroneously read, demodulating calculations shown in FIG. 7 are executed. Demodulating expressions obtained by logically compressing two tables as shown in FIGS. 6 and 7 as mentioned above can be expressed as a program of the C language as follows. G(x) denotes a position sensitivity gain at a near position x, that is, a gain for converting the value detected from the position signal PosN or PosQ by the DAC into an actual track unit. It is assumed that the demodulated gray number and track number are equal.

$$PosN = PosA - PosB;$$

$$PosQ = PosC - PosD;$$

Track=Gray;

```
if(abs(PosN) <= abs(PosQ)){
    Position = - sgn(PosQ)*G(x)*PosN + Track;
    if(sgn(PosQ)*even(Track) > 0.0)
        Position += sgn(PosQ)*sgn(PosN)*1.0;
}else{
    Position = sgn(PosN)*(G(x)*PosQ + even(Track)*0.5) + Track;
}
```

A relation between the decoded positions obtained by the demodulation calculating program and the actual position shows linear characteristics as shown in FIG. 8. The demodulation calculating program is expressed by a circuit as shown in FIG. 9. A demodulating circuit 218 receives the position signals read by the head and demodulates the track number and the position signals PosA, PosB, PosC, and PosD. Adders 220 and 222 calculate the position signals PosN and PosQ, respectively.

$$PosN = PosA - PosB$$

$$PosQ = PosC - PosD$$

Multipliers 226 and 228 obtain the prestored position sensitivity gains with reference to a position sensitivity gain file 230 according to the track number and multiply the position signals PosN and PosQ by the obtained gains. A position calculating circuit 232 compares the position signals PosN and PosQ in which position sensitivities have been corrected by the multipliers 226 and 228 and obtains position information Pos1 by the calculating expression of the corresponding interval in the demodulation table of FIG. 6. Finally, the track number, an offset, and the position Pos1 are added by an adder 234 and a decoded position is outputted. Details of the position demodulation have been disclosed in JP-A-8-195044.

Timing when the decoded position can draw a straight line as shown in FIG. 8 is timing when the position sensitivity gain can be perfectly obtained. However, a measurement error occurs when the position sensitivity gain is measured. An amount of such a measurement error is equal to 10% or more in accordance with circumstances. One of factors of the measurement error is measuring precision. The position sensitivity gain is measured while positioning at a point where the position signals PosN and PosQ are equal. However, since it is measured on the apparatus, a measurement result is influenced by a fluctuation writing upon recording of the position signals, a fluctuation of a motor, and the like, so that the position fluctuates by about ±10%. As other factors, there are a fluctuation which is caused when a servo signal is recorded onto a disk medium, particularly, a deviation of a track width, an influence of noises, a quality of the signal on the medium at the measuring point, and noises of a demodulating circuit. Consequently, it is impossible to measure the position sensitivity gain which is perfectly correct and the measurement result is certainly accompanied with an error.

FIG. 10 shows a relation between the real position and the decoded position in the case where the position sensitivity gain is deviated by −20%. FIG. 11 shows a relation between the real position and the decoded position in the case where the position sensitivity gain is deviated by +20%. If the position sensitivity gain has a measurement error as mentioned above, a stairway occurs at a boundary of an interval which is demodulated by the position signal PosN and an interval which is demodulated by the position signal PosQ. As an influence accompanied by the error of the position sensitivity gain as mentioned above, there are the following two influences. The first one is a deterioration of positioning precision which is caused upon positioning of the head. Particularly, in the magnetic disk apparatus, a reading device and a writing device of a magnetic head are physically separated and a positional deviation occurs between them. Therefore, a target position upon writing and a reading position where the written signal is read out have to be deviated. Such a situation is called a read offset. The read offset has to be set to a different value every track or every zone in which a plurality of tracks are grouped into one region in accordance with dimensional shapes of the reading device and the writing device of the magnetic head which is mounted in the apparatus and in accordance with a yaw angle of a rotary actuator. Therefore, the target position is set to a point near the boundary of the position signals PosN and PosQ in dependence on the position of the read offset. At this time, if an error of the position sensitivity gain occurs, a deviation occurs between the position demodulated by the PosN and the position demodulated by the PosQ. Therefore, if the head is positioned at such a place, the positioning precision deteriorates and it is likely that the information recorded as data is erroneously read. The second one is precision of a detected position itself. A phenomenon such that the position sensitivity gain changes by 20% as shown in FIGS. 10 and 11 denotes that the detected position changes by 20% as a result. In the positioning control of the magnetic disk apparatus, it is an object to allow the positioning precision to lie within a target specification. However, if the precision of the detected position itself is uncertain, whether the specification itself could be satisfied or not cannot be guaranteed. As mentioned above, according to the conventional position demodulating method, although a condition that the position sensitivity gain is perfectly correct is set as a prerequisite, so long as its value cannot be correctly measured but has an error, the occurrence of the stairway at the demodulation boundary of the position signals PosN and PosQ cannot be avoided.

SUMMARY OF THE INVENTION

According to the invention, there are provided position demodulating method and circuit of a disk apparatus, in which a stairway at a switching boundary of position signals can be eliminated and, even if an error of position sensitivity occurs, a more accurate position can be demodulated.

According to the invention, there is provided a position demodulating method of a disk apparatus, for calculating a decoded position after position signals PosA, PosB, PosC, and PosD of a disk read by a head were demodulated, comprising:

a first step wherein after position information of different phases are demodulated from the position signals PosA, PosB, PosC, and PosD, they are multiplied by a position sensitivity gain, respectively, and first position information PosN and second position information PosQ are calculated;

a second step wherein the first position information PosN and the second position information PosQ are compared and third position information Pos1 and fourth position information Pos2 in which influences of an error of the position sensitivity gain appear oppositely are calculated; and a third step wherein a first weight gain G1 and a second weight gain G2 are obtained from the third position information Pos1 and the decoded position is calculated by including an addition value of a multiplication value obtained by multiplying the third position information Pos1 by the first weight gain G1 and a multiplication value obtained by multiplying the fourth position information Pos2 by the second weight gain G2.

According to the position demodulating method of the invention, even if the position sensitivity gain includes the error, by obtaining the decoded position by a calculation for synthesizing position signals Pos1 and Pos2 in which the influences of the error of the position sensitivity gain appear oppositely, the influences of the error of the position sensitivity gain can be avoided. For example, if the position sensitivity gain includes the error of +10%, a deviation of Pos1 is set to +10% and a deviation of Pos2 is set to −10%. If the weight gains at this time for Pos1 and Pos2 are equal to 0.5, by calculating 0.5*Pos1+0.5*Pos2, the influences of the error of the position sensitivity gain can be set to zero. Therefore, the stairway at a position near the switching boundary of the position signals PosN and PosQ can be eliminated. As compared with the first weight gain G1=M, the second weight gain G2 is equal to a value G2=(1−M) obtained by subtracting the first weight gain from 1. The first weight gain M is assumed to be a segment primary function M=−2|k|x+1 which changes like a triangle with respect to a detected position kx (where, the position sensitivity gain k=1) so as to be equal to 1 at a track center and 0 at track boundary positions on both sides. In consideration of the fluctuation of the position sensitivity gain k, the first weight gain is assumed to be a segment primary function which changes like a triangle with respect to the detected position kx which is restricted to 1 at the track center and to a lower limit value 0.5 at a position near the switching position of the first position information PosN and the second position information PosQ on both sides. In order to eliminate the influences of the saturation of the position information PosN and PosQ, the first weight gain is assumed to be a segment primary function which changes like a trapezoid with respect to the detected position kx which is restricted to 1 at a position in front of the switching position of the first position information PosN and the second position information PosQ on both sides from the track center and to a lower limit value 0.5 at a position near the switching position. In place of the function which changes like a trapezoid, the first weight gain can be also set to a curve function such as a sine curve or the like which changes with respect to the detected position which is set to 1 at a position before the switching position of the first position information PosN and the second position information PosQ on both sides from the track center and is restricted to a lower limit value 0.5 at a position near the switching position. Further, the first weight gain is assumed to be a segment primary function which changes like a triangle with respect to the detected position which is restricted to 1 at the track center and to a lower limit value 0.5 at a position near the switching position of the first position information PosN and the second position information PosQ on both sides. In order to eliminate an influence of saturation of the positions PosN and PosQ, the first weight gain is determined with reference to the segment primary function according to the third position information Pos1 whose saturation characteristics have been corrected. In the second step, a first speed correcting position and a second speed correcting position which are proportional to a moving speed of the head are obtained every third position information Pos1 and fourth position information Pos2 and added. Thus, the correct position can be demodulated even in a state where the head speed during the seeking operation is not equal to 0.

According to the invention, there is provided a position demodulating circuit of a disk apparatus, for calculating a decoded position from position signals of a disk read by a head, comprising:

a first circuit unit 48 which demodulates position information of different phases from the position signals, subsequently multiplies the position information by a position sensitivity gain, respectively, and calculates first position information PosN and second position information PosQ;

a second circuit unit 50 which compares the first position information PosN with the second position information PosQ and calculates third position information Pos1 and fourth position information Pos2 in which influences of an error of the position sensitivity gain appear oppositely; and a third circuit unit 52 which obtains a first weight gain G1 and a second weight gain G2 from the third position information Pos1 and calculates a decoded position by including an addition value of a multiplication value obtained by multiplying the third position information by the first weight gain and a multiplication value obtained by multiplying the fourth position information by the second weight gain.

The above and other objects, features, and advantages of the present invention will become more apparent from the following detailed description with reference to the drawings.

BRIEF DESCRIPTION OF THE DRAWINGS

FIG. 6 is an explanatory diagram of a demodulating calculation in the case where a track number is normal;

FIG. 7 is an explanatory diagram of a demodulating calculation in the case where the track number is abnormal;

FIG. 25 is an explanatory diagram of a demodulation table which is used in the synthesis demodulation of the invention;

DETAILED DESCRIPTION OF THE PREFERRED EMBODIMENT

Figure 12:
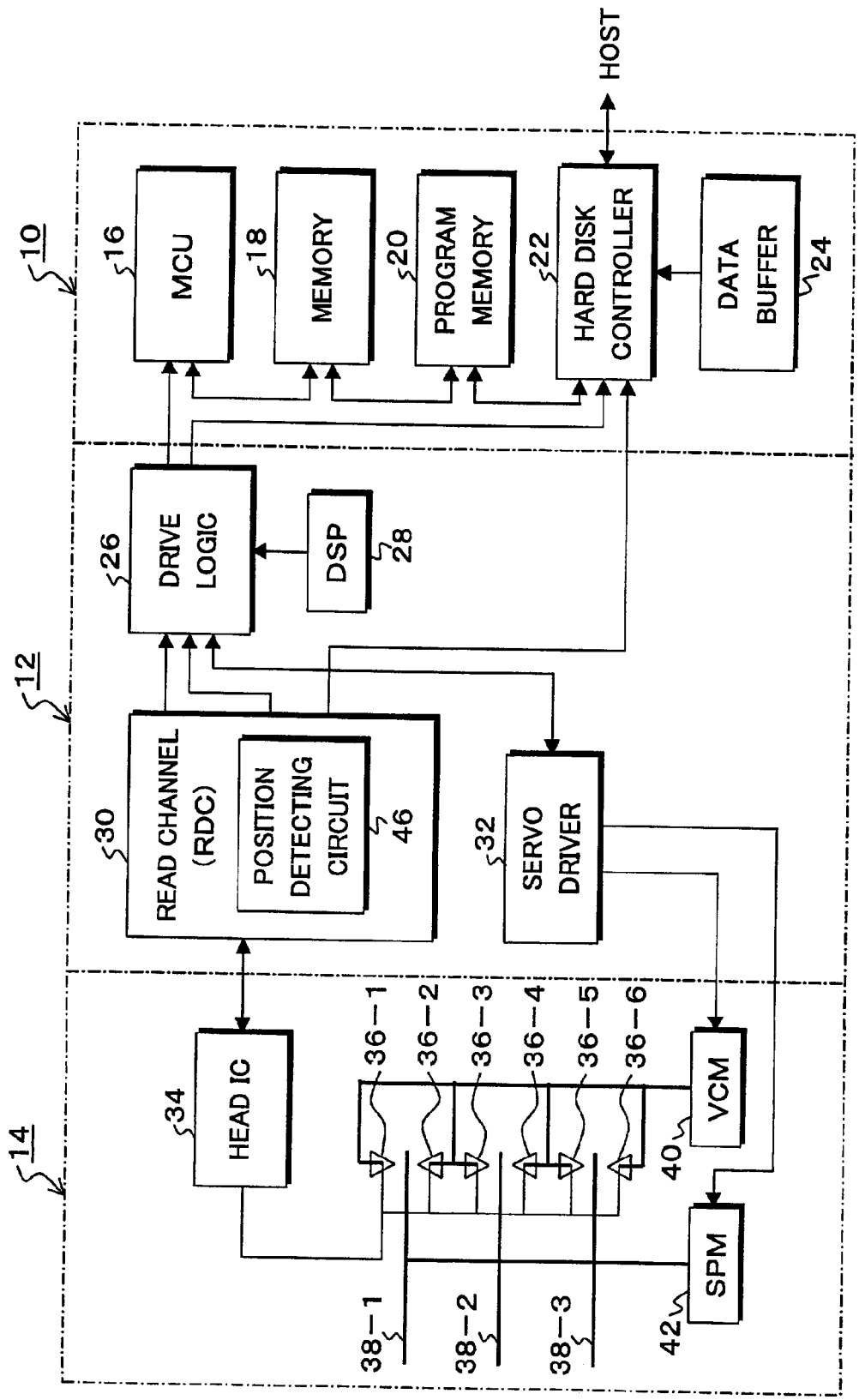
FIG. 12 is a circuit block diagram of a hard disk drive to which the invention is applied.

FIG. 12 is a block diagram of a hard disk drive to which the invention is applied. The hard disk drive is constructed by an SCSI controller 10, a drive controller 12, and a disk enclosure 14. An interface with a host is not restricted to the SCSI controller 10 but another proper interface controller can be used. The SCSI controller 10 comprises: an MCU (Main Control Unit) 16; a memory 18 using a DRAM or an SRAM which is used as a control memory; a program memory 20 using a nonvolatile memory such as a flash memory which stores a control program; a hard disk controller (HDC) 22; and a data buffer 24. The drive controller 12 comprises: a drive logic 26; a DSP 28; a read channel 30; and a servo driver 32. A position detecting circuit 46 using a position demodulating method of the invention is provided for the read channel 30. Further, a head IC 34 is provided for the disk enclosure 14. Combination heads 36-1 to 36-6 each having a writing head device and a reading head device are connected to the head IC 34, respectively. The combination heads 36-1 to 36-6 are provided for recording surfaces of magnetic disks 38-1 to 38-3 and moved to arbitrary track positions on the magnetic disks 38-1 to 38-3 by the driving of a rotary actuator by a VCM 40. The magnetic disks 38-1 to 38-3 are rotated at a constant speed by a spindle motor 42.

Figures 13A, 13B, 13C:
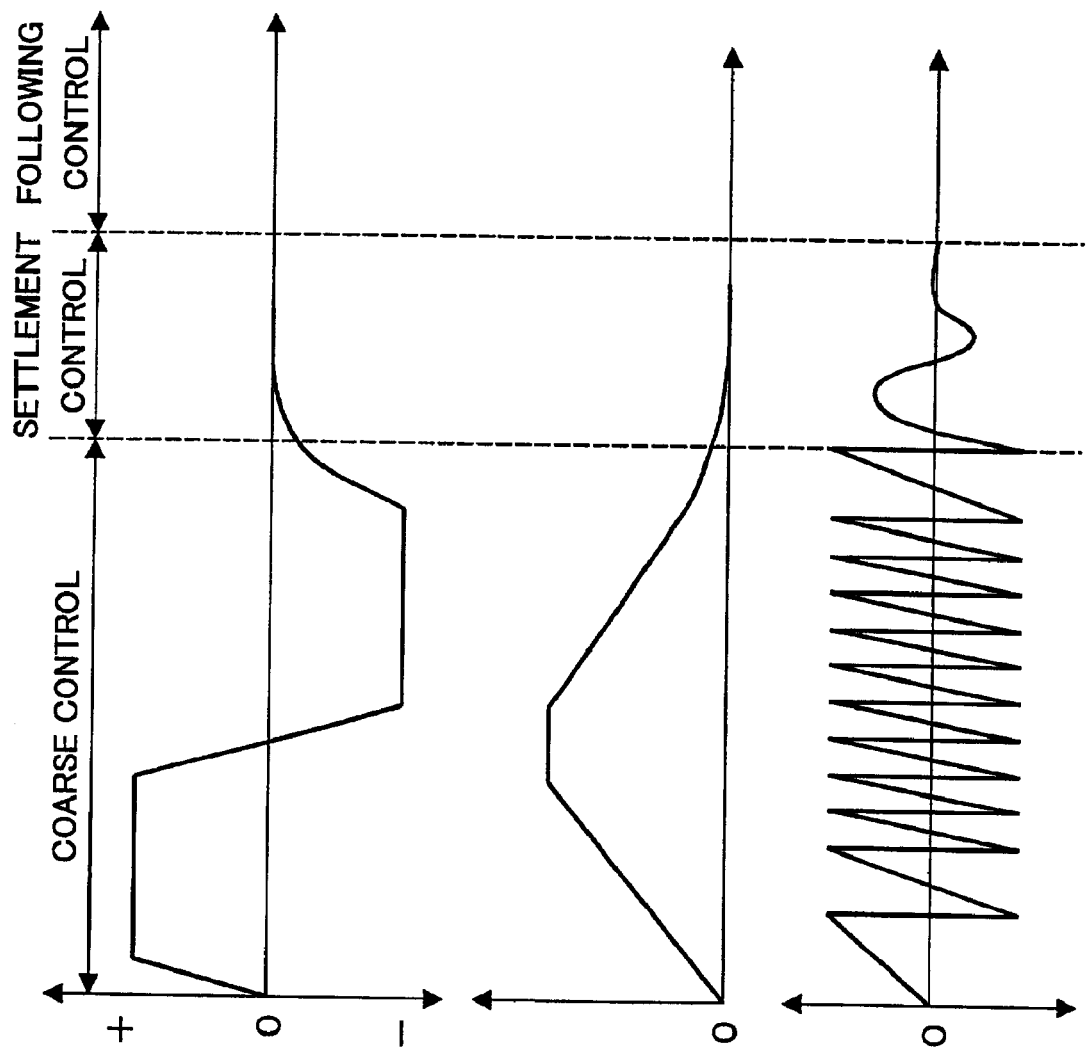
FIGS. 13A to 13C are time charts for a head positioning control.

FIGS. 13A to 13C are time charts for a coarse control, a settlement control, and a following control according to an error of the position detected by the position detecting circuit 46. Those controls are executed by a servo controller for a head positioning control by the DSP 28 provided for the drive controller 12 in FIG. 12. The seek control is a control including the coarse control and the settlement control. The coarse control is a speed control for positioning the head to the target position. The coarse control is executed by a speed control, a PD control, an observer control which does not include a steady bias presumption, or the like. That is, as shown in a speed in FIG. 13B, according to the coarse control, a control mode is switched to an accelerating mode, a constant speed mode, and a decelerating mode. The accelerating mode is a control for supplying an accelerating current and increasing the speed. The constant speed mode is a control for controlling the current so as to maintain a target speed, thereby allowing the speed to be held to a constant speed. The decelerating mode is a control for supplying an decelerating current in the direction opposite to that upon acceleration and setting the speed to a speed that is approximate to 0 at a position near the target position. If a distance is short, the constant speed mode is not included. When the coarse control is finished, the settlement control is performed. The settlement control is a control mode for playing a role for coupling the coarse control and the following control and an integration element is included in a control system. Thus, the head is led to a target track. The following control after completion of the settlement control is a control for allowing the head to follow the target position. The following control is constructed by a PID control, PI×LeadLag, an observer control including the steady bias presumption, and the like.

Figure 14:
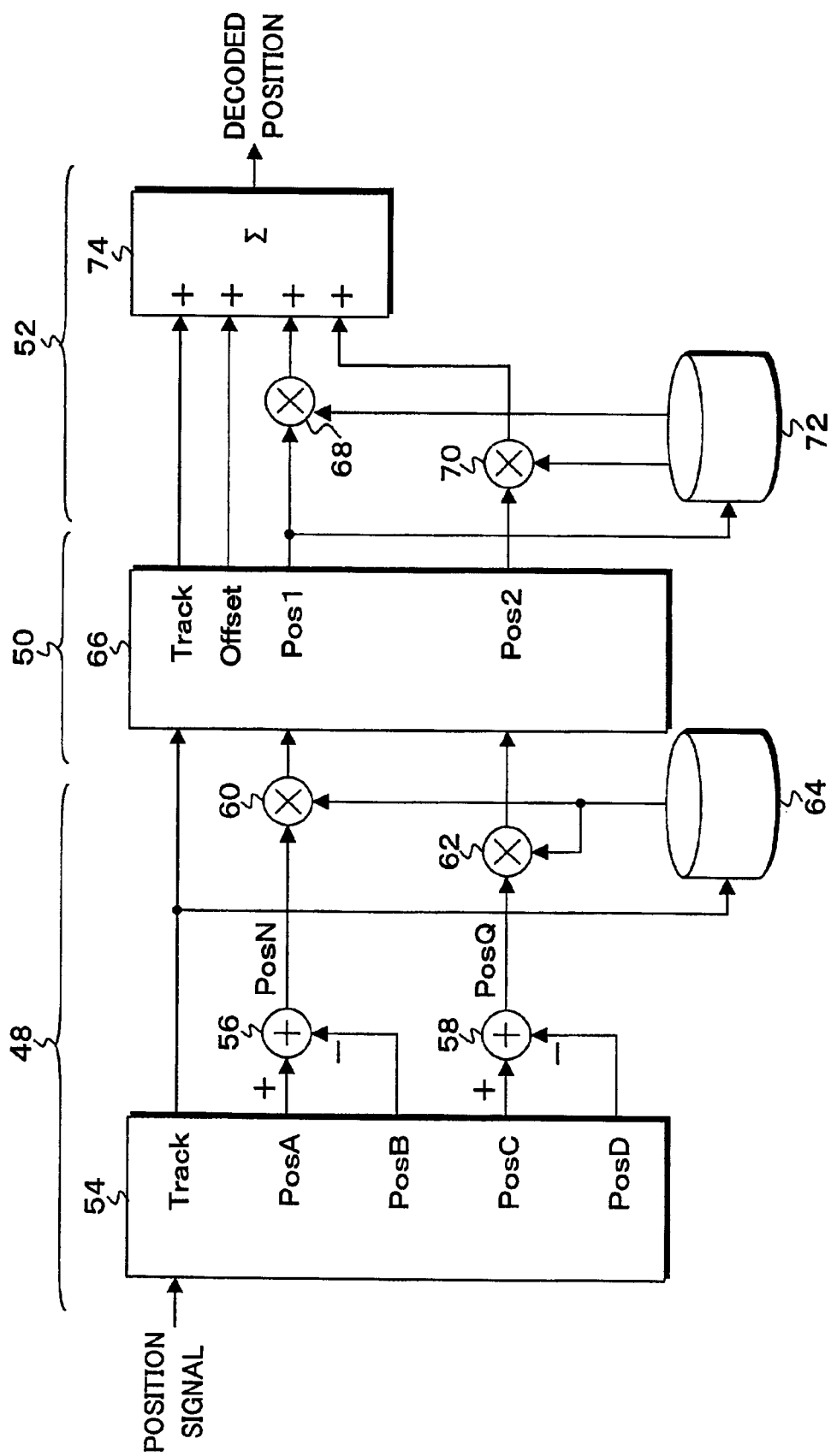
FIG. 14 is a block diagram of a position demodulating circuit according to the invention.

FIG. 14 is a block diagram showing a functional construction of the position detecting circuit 46 built in the read channel 30 in FIG. 12. For explaining a principle of the invention, a case where the speed of the head is set to 0 is considered as a target. The position detecting circuit comprises a first circuit unit 48, a second circuit unit 50, and a third circuit unit 52. The first circuit unit 48 comprises a demodulating circuit 54, adders 56 and 58, multipliers 60 and 62, and a position sensitivity gain file 64. The first circuit unit 48 inputs the position signals of the disk which were read out by the head, specifically speaking, the position signals having the signal waveforms shown in FIG. 3, obtains a track number (gray code), signal areas of burst signals, or areas of the absolute values of the signals, and outputs the position signals PosA, PosB, PosC, and PosD, respectively. The adders 56 and 58 obtains two position information PosN and PosQ as follows by using the four position signals PosA, PosB, PosC, and PosD which are outputted from the demodulating circuit 54.

$$PosN = PosA - PosB$$

$$PosQ = PosC - PosD$$

The multipliers 60 and 62 read out a position sensitivity gain G(x) which has previously been detected and stored in the position sensitivity gain file 64 and multiply the position information PosN and PosQ from the adders 56 and 58 by the position sensitivity gain G(x), thereby correcting the position sensitivity. The second circuit unit 50 comprises a position calculating circuit 66. The position calculating circuit 66 compares the position information PosN and PosQ in which the position sensitivities have already been corrected and which are outputted from the multipliers 60 and 62, thereby calculating the position information Pos1 and Pos2 in which influences of the error of the position sensitivity gain appear oppositely. As shown in FIG. 6, the position calculating circuit 66 calculates the position information Pos1 and Pos2 in which the opposite influences appear with respect to the position sensitivity gain on the basis of corresponding calculating expressions, which will be clearly explained hereinlater, by using the position information whose absolute value is smaller between the position information PosN and PosQ in each interval obtained by dividing two adjacent tracks into eight segments. The third circuit unit 52 comprises multipliers 68 and 70, a weight function file 72, and an adder 74. The third circuit unit 52 obtains weight gains G1 and G2 with reference to the weight function file 72 according to the position information Pos1. The multiplier 68 multiplies the position information Pos1 by the weight gain G1. The multiplier 70 multiplies the position information Pos2 by the weight gain G2. Finally, the adder 74 adds the track number, the offset, and multiplication results of the multipliers 68 and 70, so that the decoded position can be calculated. There is a relation of G2=1−M between the weight gains G1 and G2 which are multiplied to the position information Pos1 and Pos2 when it is assumed that the weight gain G1=M. That is, in the third circuit unit 52, by synthesizing the weight gains G1 and G2 (where, G1+G2=1) to the position information Pos1 and Pos2 in which the influences of the error of the position sensitivity gain appear oppositely and which were outputted from the position calculating circuit 66, the influences of the error of the position sensitivity gain are avoided.

Figure 10:
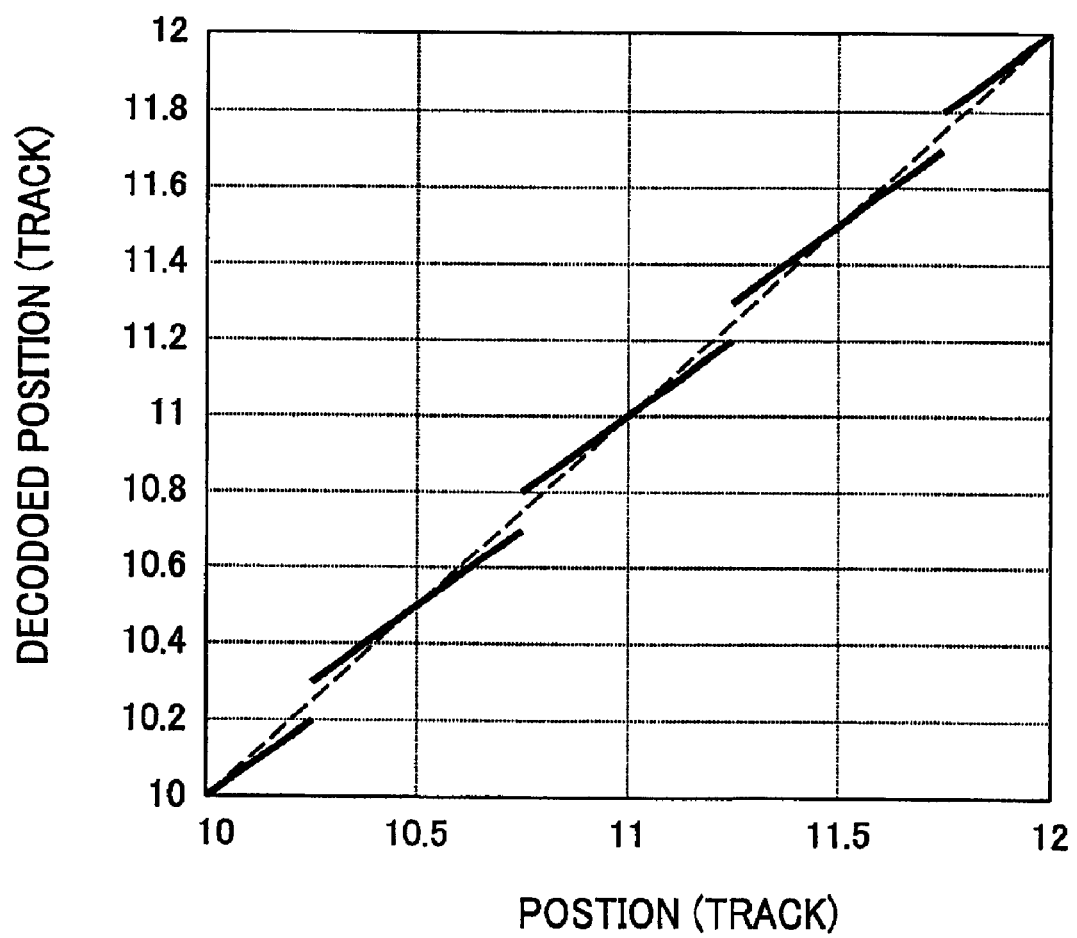
FIG. 10 is an explanatory diagram of the measuring position at the time when the position sensitivity is deviated by −20%.
Figure 11:
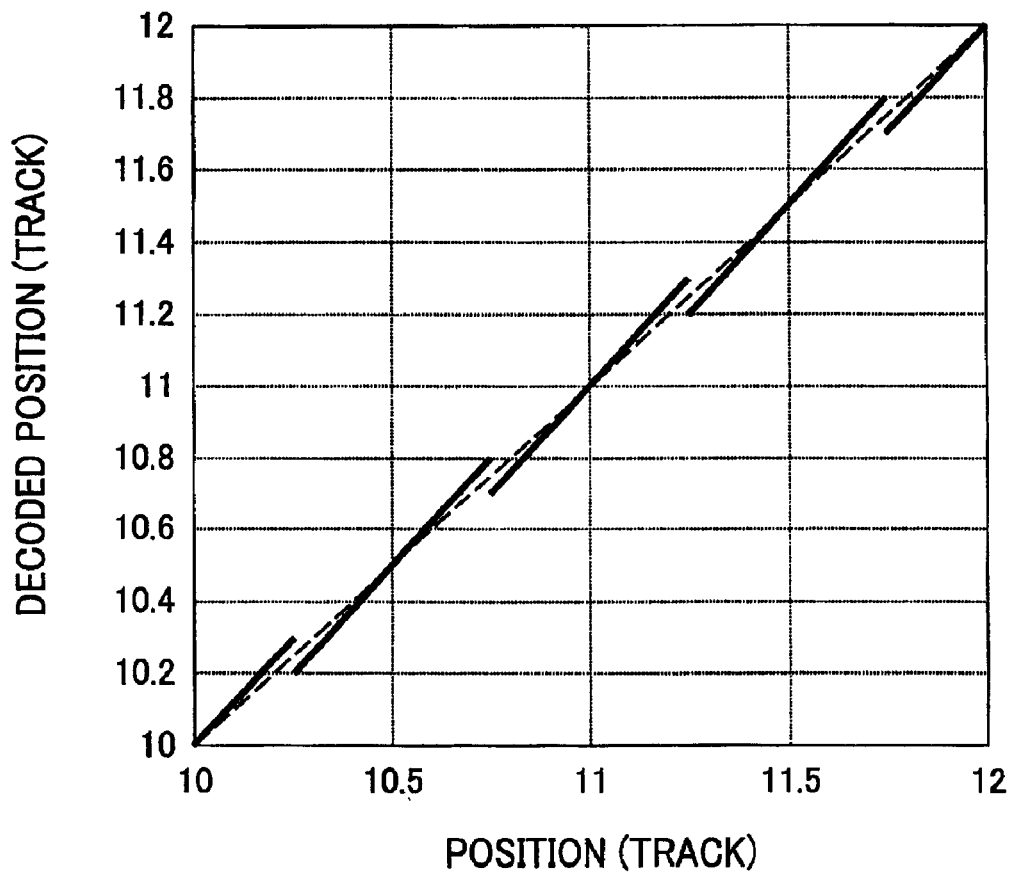
FIG. 11 is an explanatory diagram of the measuring position at the time when the position sensitivity is deviated by +20%.

Subsequently, a method of deriving the weight function which is used in the third circuit unit 52 in FIG. 14 will be described. In order to eliminate the stairway near the switching boundary of the position information PosN and PosQ in association with the deviations of the position sensitivity as shown in FIGS. 10 and 11, there is a calculating method whereby the detected position information PosN and PosQ are added and divided by 2. That is, (PosN+PosQ)/2

Figure 4:
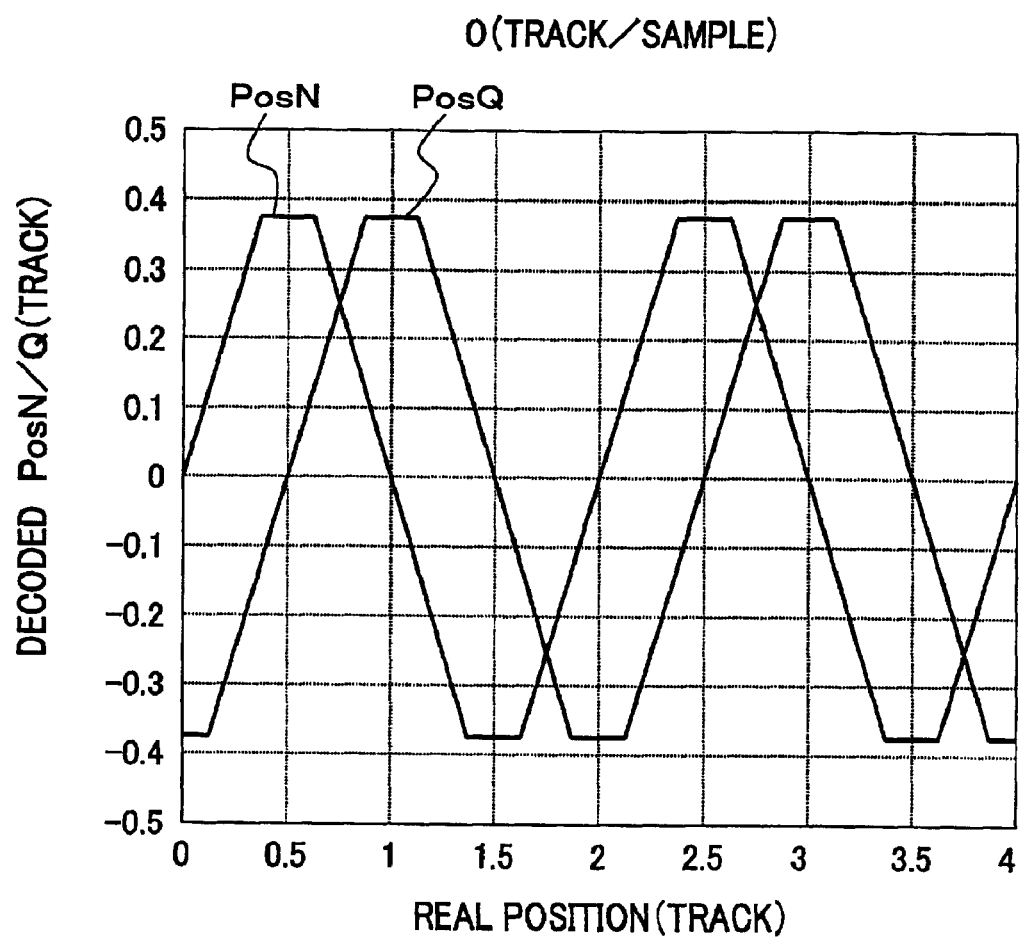
FIG. 4 is an explanatory diagram of position information PosN and PosQ demodulated from burst signals.
Figure 5:
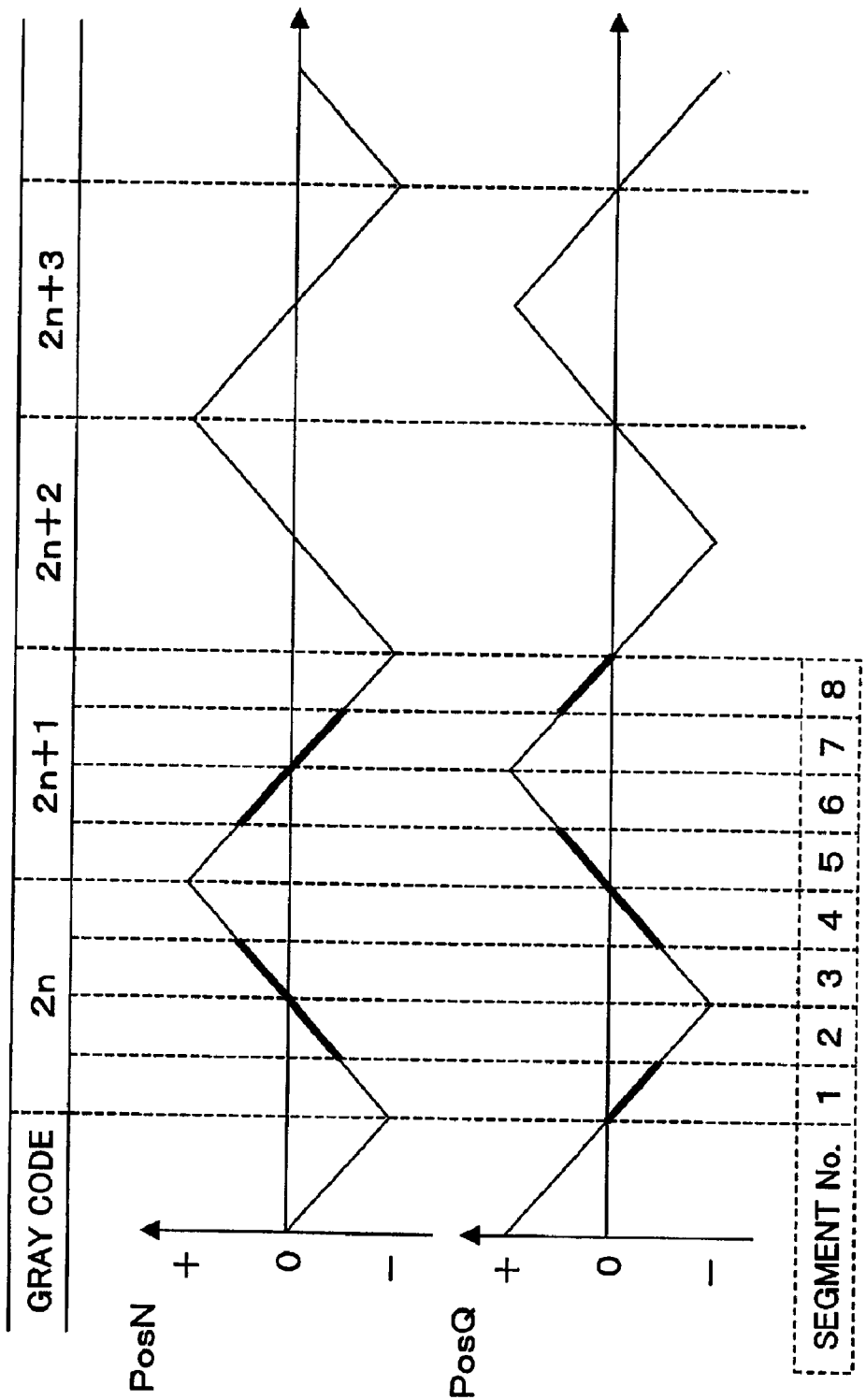
FIG. 5 is an explanatory diagram of demodulating intervals segmented for position demodulating calculations.
Figure 8:
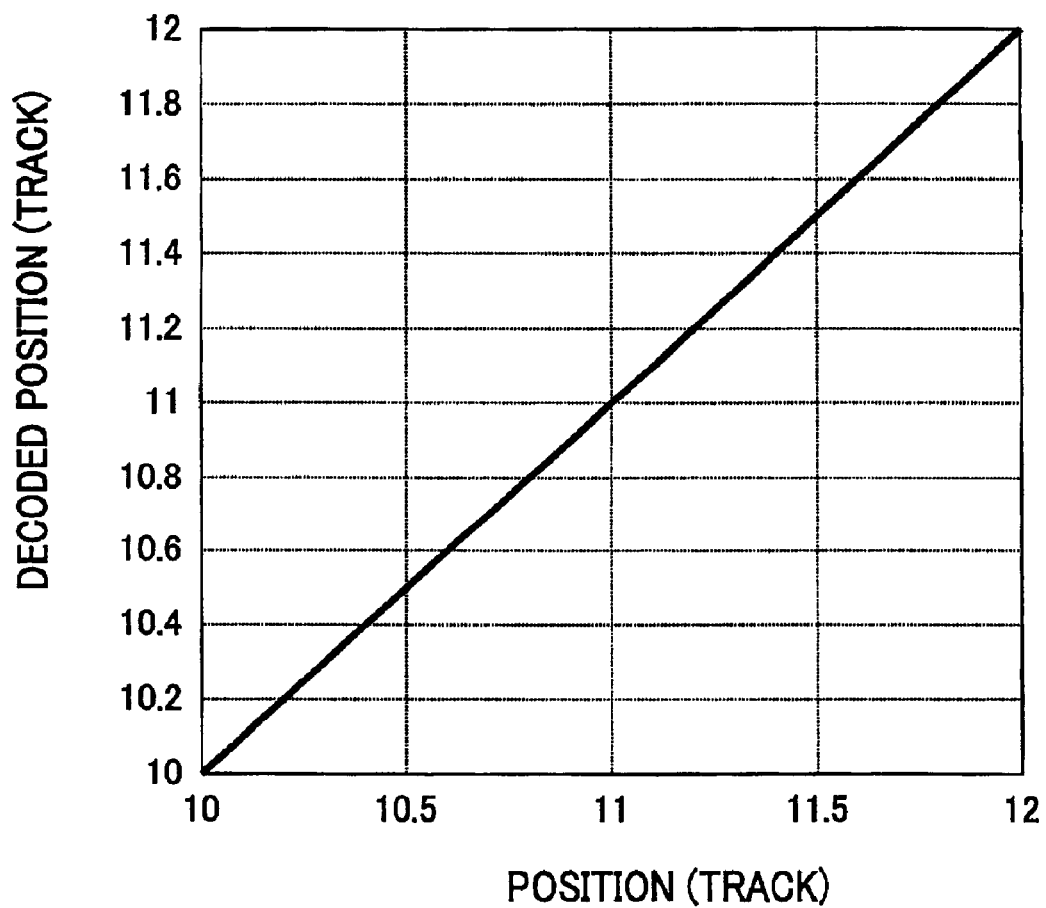
FIG. 8 is an explanatory diagram of a measuring position at the time when there is no error of a position sensitivity.

However, according to such a method, the head positioning control cannot be actually executed. This is because the position information PosN and PosQ are triangular waves as shown in FIG. 4 and an inclination of each wave changes to a positive or negative value every location. Since phases of the position information PosN and PosQ are different from each other, an amount corresponding to a phase deviation, that is, a positional deviation has to be also considered. Therefore, a different calculating expression is needed every location.

Figure 15:
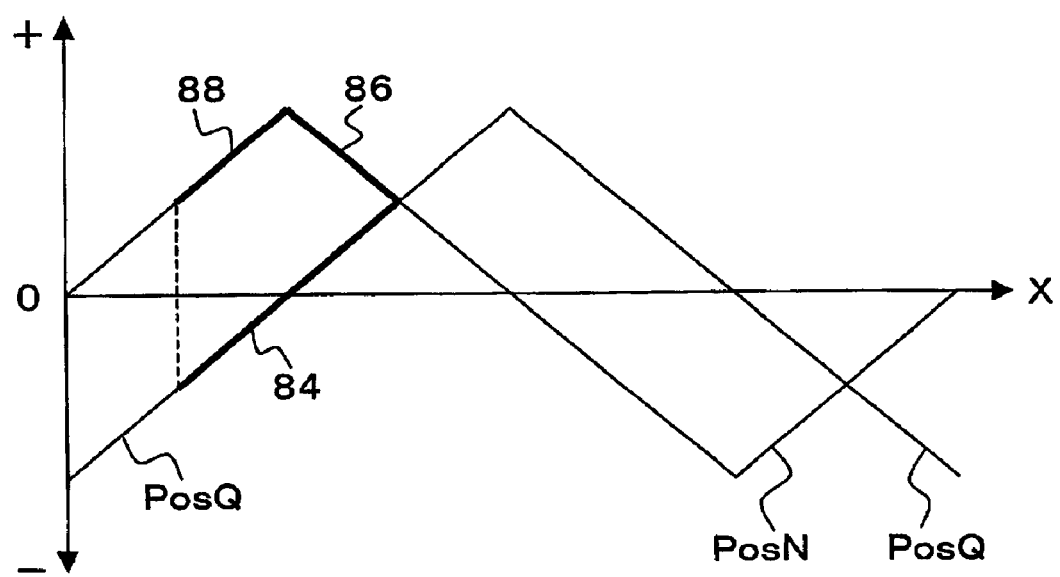
FIG. 15 is an explanatory diagram of intervals of positions PosN and PosQ which are used in a synthesis demodulation according to the invention.

FIG. 15 shows the position information PosN and PosQ which are calculated by the adders 56 and 58 in FIG. 14. There is now considered a case where with respect to the position information PosQ, the position is demodulated in an interval 84 shown by a bold line, and at the same time, the position is demodulated by using intervals 86 and 88 shown by bold lines in the position information PosN.

Figure 16:
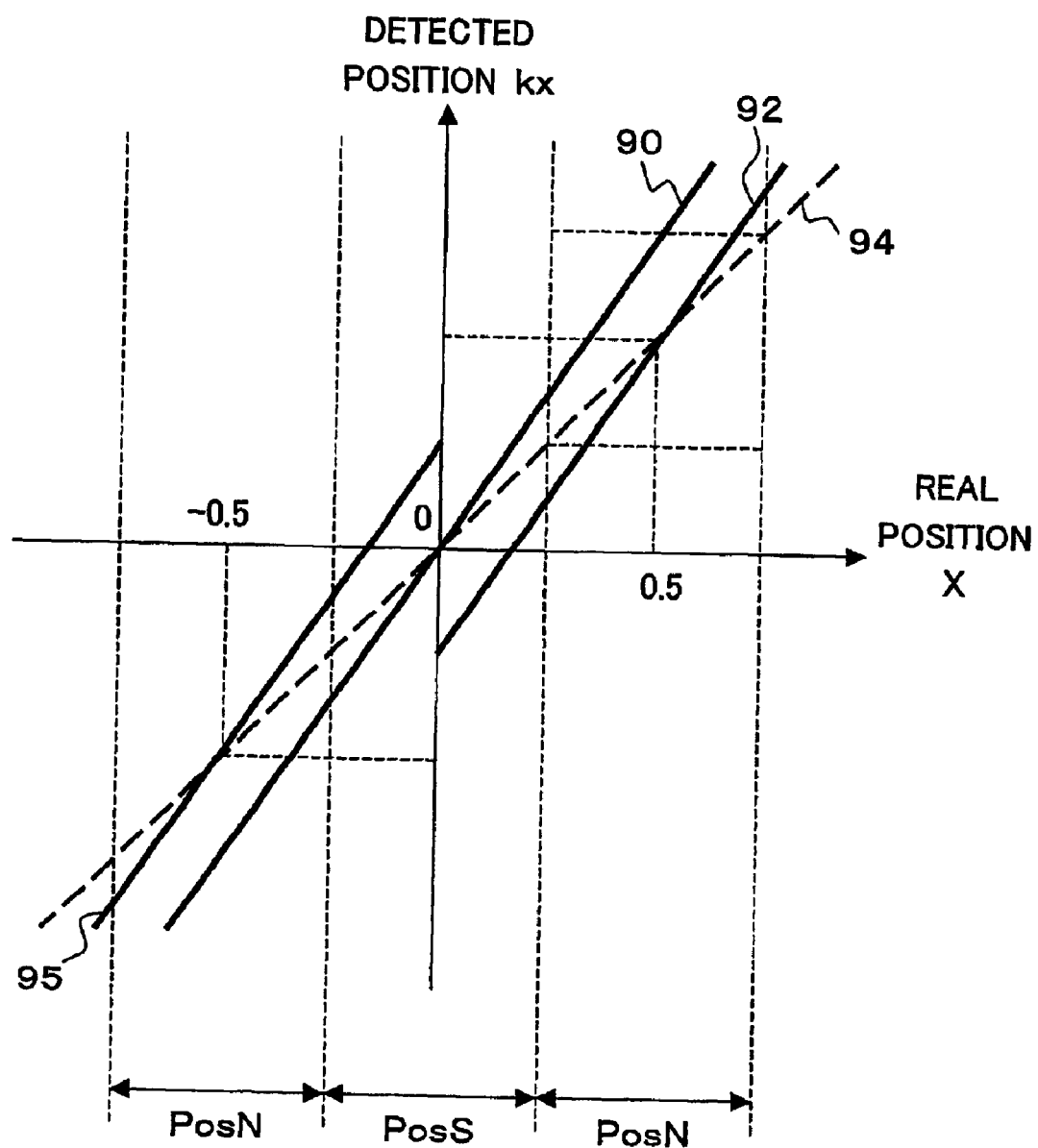
FIG. 16 is an explanatory diagram of detected positions with respect to real positions demodulated from the positions PosN and PosQ in FIG. 15.

FIG. 16 shows a curve which is obtained in the case where an axis of ordinate indicates the detected position at the time when the position is demodulated by using each of the intervals 84, 86, and 88 in FIG. 15 and an axis of abscissa denotes the absolute value. The position sensitivity gain including the error is expressed by k here. Therefore, the detected position on the axis of ordinate is expressed by kx. When the position sensitivity gain is larger than a correct value, a curve of a line 90 is drawn. At the position which is demodulated by using the position information PosN of the position which is deviated from the position of offset 0 by a distance corresponding to ½ track, a curve of a line 92 is drawn. A curve of each of the lines 90 and 92 will be expressed by the following equations.

$$ya = kx \tag{1}$$

$$yb = k(x-0.5)+0.5 \tag{2}$$

Ideally, even if the value of the position sensitivity gain k has an error, there is a relation $$y = x$$

between a decoded position y and an absolute position x. Therefore, those two curves are added and conditions for allowing an addition result to coincide with the curve at the correct decoded position shown by a broken line 94 are obtained. Specifically speaking, a method whereby a decoded position ya is multiplied by the weight gain M, a decoded position yb is multiplied by the demodulating gain (1−M), and both multiplication results are synthesized is considered.

$$y = Mkx + (1-M)(k(x-0.5)+0.5) \tag{3}$$
$$= 0.5(k-1)M + kx - 0.5(k-1)$$

To prevent the equation (3) from being influenced by the position sensitivity gain k, it is sufficient that the detected position kx coincides with the absolute position x. Conditions of a gain M for this purpose are calculated by the following equations.

$$x = 0.5(k-1)M + kx - 0.5(k-1) \tag{4}$$
$$0.5(k-1)M = -(k-1)x + 0.5(k-1)$$
$$M = -2x + 1$$

That is, it is sufficient that the weight gain M is a primary function of the absolute position x.

Although the curve 92 existing on the + side for the curve of the line 90 in FIG. 16 has been considered, when a relation with a curve of 40 a line 95 existing on the − side is similarly considered, the gain M is expressed as follows.

$$M = 2x + 1 \tag{5}$$

By getting the absolute value of the absolute position x, the equations (4) and (5) can be collectively expressed by the following equation.

$$M = -2|x| + 1 \tag{6}$$

Figure 17:
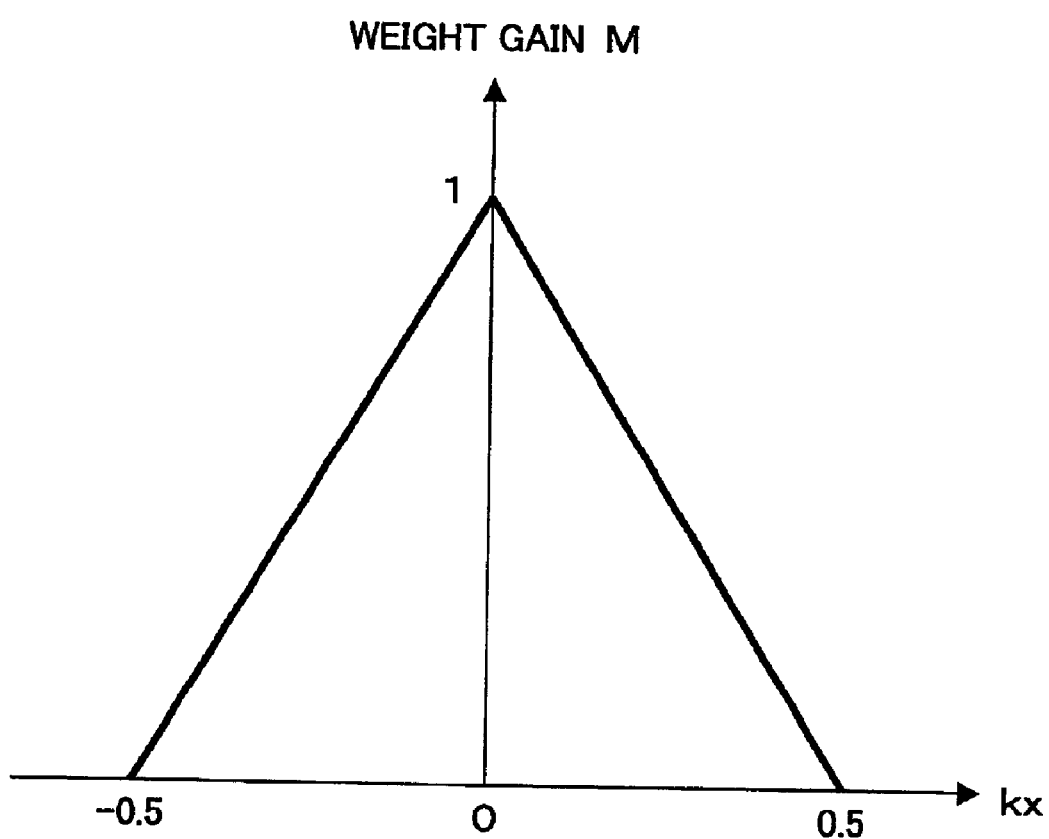
FIG. 17 is an explanatory diagram of a triangular weight function which is used for the synthesis demodulation of the invention.

That is, it will be understood that it is sufficient to multiply the weight function of the triangle shown in FIG. 17. However, there is one thing which should be noted. That is, the weight function M is a function of the absolute position x and the influence of the position sensitivity gain k is not included in anywhere in the equation (6). There is, however, a problem such that a position which can be actually measured is only the detected position kx and the position sensitivity gain k including the error is not known. Such a problem due to the unknown position sensitivity gain k appears markedly at the time of the demodulation of a position near the switching boundary of the position information PosN and PosQ. At the time of such a demodulation of a position near the switching boundary, a value close to the weight gain M=0.5 should be used. However, since there is only a method whereby y=kx is used in place of y=x, the weight gain M is not equal to 0.5. For example, when a weight function M' is calculated by the following equation $$M' = 2kx + 1$$

by using the detected position y=kx at the time when the position sensitivity gain k=1.2 with respect to a case where the absolute position x=0.25, M'=0.4 is obtained. When the detected positions ya and yb at this time are calculated from the equations (1) and (2), $$ya = 0.3$$
$$yb = 0.2$$

are obtained. Therefore, a result of the synthesis demodulation which is given by the equation (3) becomes as follows.

$$y = M*ya + (1-M)*yb$$
$$= 0.4*0.3 + (1-0.4)*0.2$$
$$= 0.24$$

Figure 18:
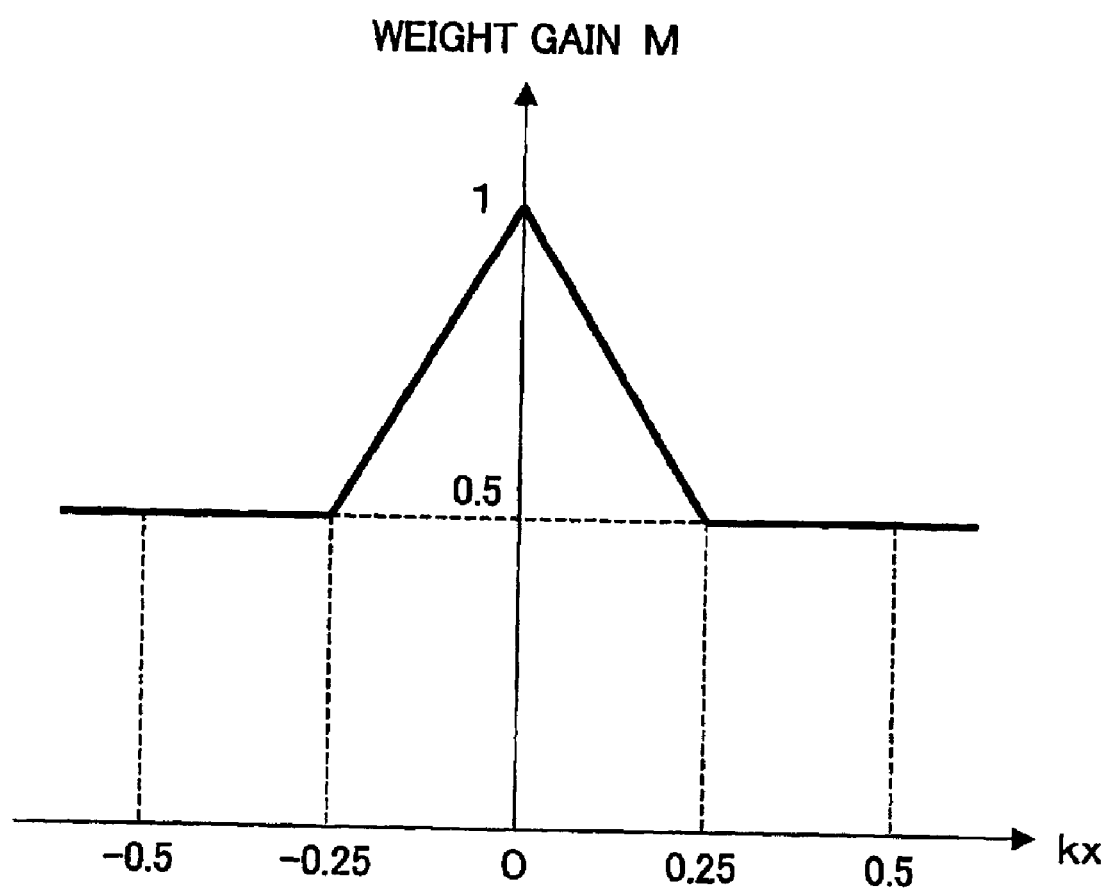
FIG. 18 is an explanatory diagram of the triangular weight function in which a lower limit value that is used for the synthesis demodulation of the invention is restricted to 0.5.

That is, the synthesis demodulation result is deviated from the real position x=0.25 by 0.01. To avoid such a phenomenon, it is sufficient to restrict the lower limit value of the calculation result of the weight function M. That is, in addition to conditions $$M = -2x + 1 \text{ (when } x \geq 0\text{)}$$
$$2x + 1 \text{ (when } x < 0\text{),}$$

it is sufficient to add a condition that M is restricted to (M=0.5) when M<0.5. In this case, when the synthesis demodulation result is calculated with respect to the position sensitivity gain k=1.2, $$y = 0.5*0.3 + 0.5*0.2$$
$$= 0.25$$

is obtained and no deviation is caused. By restricting the lower limit value of the weight function M to 0.5 as mentioned above, the error in association with the reference to the weight function by the detected position kx can be eliminated. FIG. 18 shows a weight function obtained after the correction in the case where the lower limit value of the weight function is restricted to 0.5. Even if the lower limit value of the weight function is restricted to 0.5 as mentioned above, the following drawback further exists. That is, it is an influence of the saturation of the position information PosN and PosQ. According to the position information PosN and PosQ, since a read core width is narrower than a burst width of the burst signals recorded on the disk, the weight function does not show a triangular wave but shows a saturation waveform whose head is made flat as shown in FIG. 4. As a result of the measurement of the actual characteristics, the saturation portion in FIG. 4 is not perfectly flat but becomes a straight line. This is because the detecting sensitivity of the head does not show a rectangular shape but shows a curve.

Figure 19:
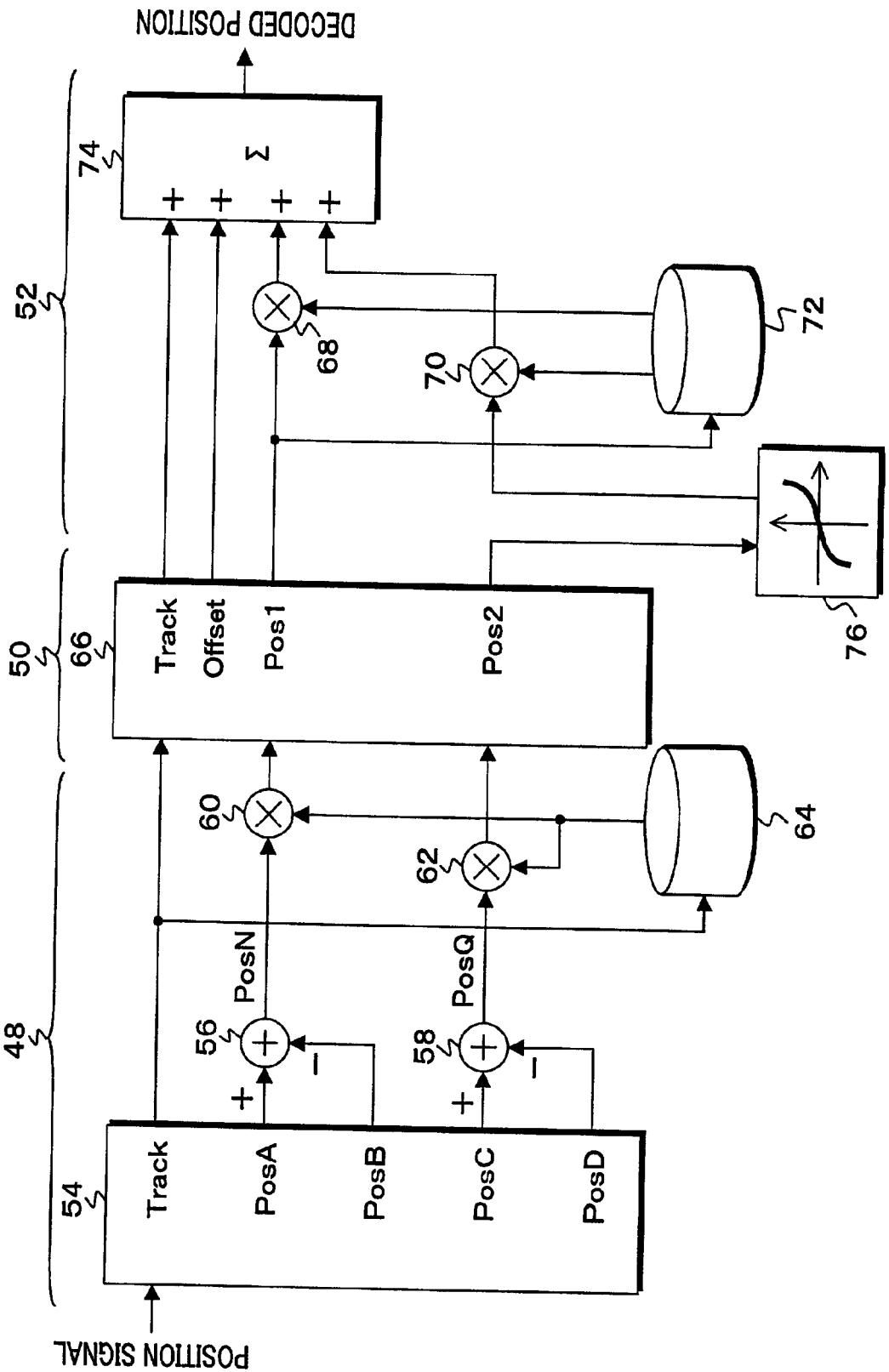
FIG. 19 is a block diagram of the position demodulating circuit according to the invention for making a signal saturation correction.

As one of methods of eliminating the influence of the saturation of the position information PosN and PosQ, as shown in a block diagram of FIG. 19, there is a method of demodulating the position in consideration of the saturation characteristics. The block diagram of FIG. 19 is fundamentally the same as FIG. 14 except that the position information Pos2 outputted from the position calculating circuit 66 in the second circuit unit is inputted to a signal saturation corrector and the saturation portion is corrected to a non-saturating state of the triangle. A table having a curve whose characteristics are opposite to the saturation characteristics has been stored in a signal saturation corrector 76. As such a curve whose characteristics are opposite to the saturation characteristics, an average curve can be previously obtained from the characteristics of many heads or the curve can be also measured every head. Therefore, the position information Pos2 which is outputted from the signal saturation corrector 76 becomes the position information whose saturation portion has been compensated and which changes in a triangular shape. By multiplying the position information by the weight gain $G2=1-M$ read out from the weight function file 72 by the multiplier 70, the influences of the saturation of the position information PosN and PosQ are eliminated. In FIG. 19, although the signal saturation corrector 76 has been provided only on the position information Pos2 side, it can be also provided on the position information Pos1 side.

Figure 20:
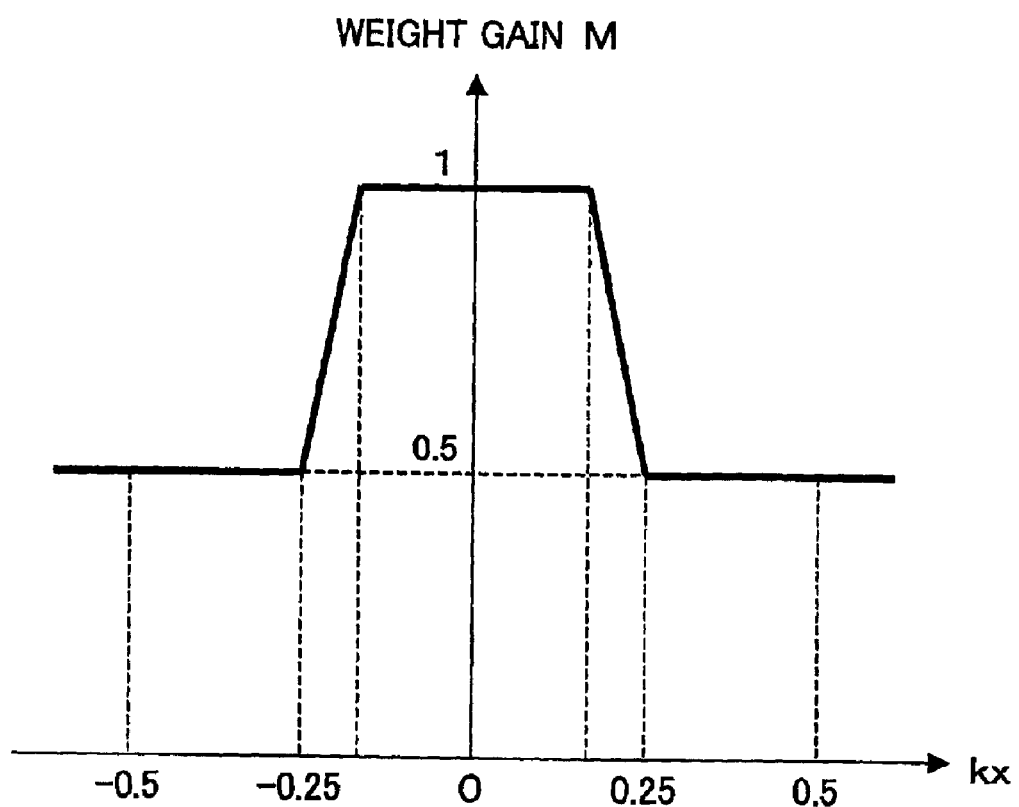
FIG. 20 is an explanatory diagram of a trapezoidal weight function which is used for the synthesis demodulation of the invention.
Figure 21:
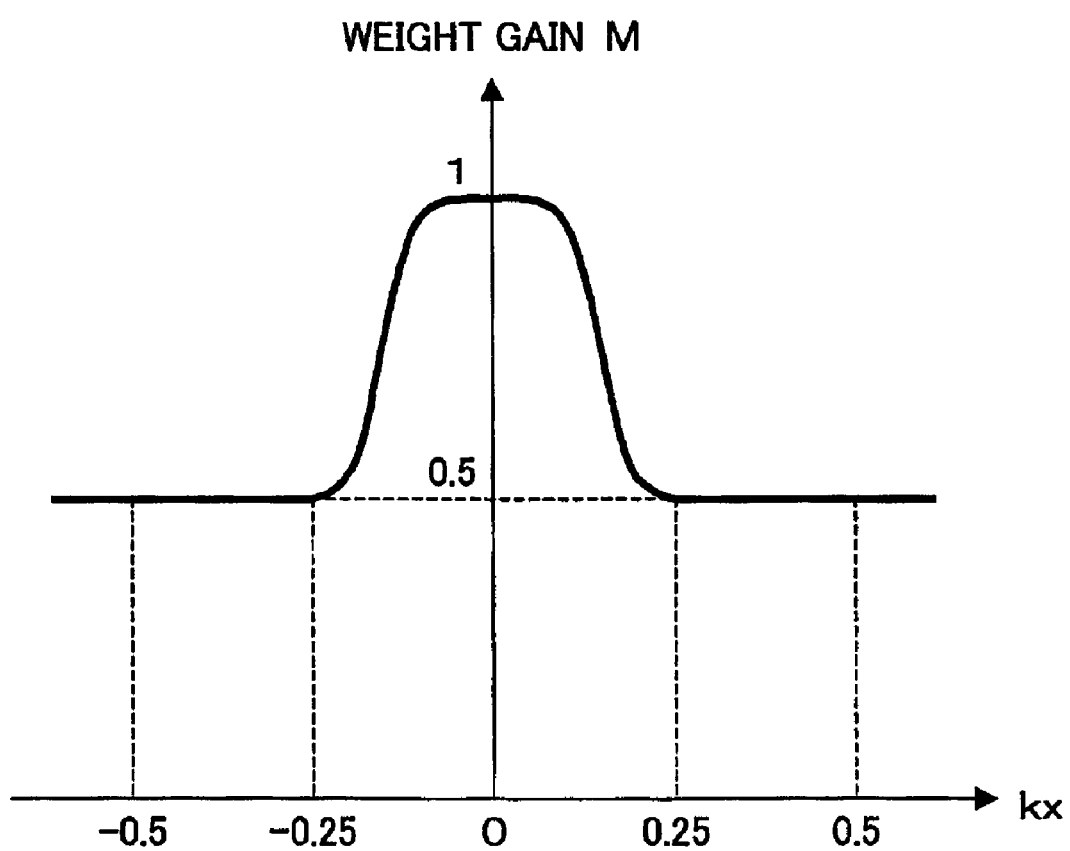
FIG. 21 is an explanatory diagram of the trapezoidal weight function in which the trapezoidal shape in FIG. 20 is set to a curve.

The second method of eliminating the influences of the saturation of the position information PosN and PosQ is to set the weight function to a trapezoidal weight as shown in FIG. 20. That is, the weight at a center position O serving as a track center is set to 1, a range of this weight position is set to 1 up to a position in front of the switching boundary of the position information PosN and PosQ, the weight at a position near the switching boundary is set to 0.5, and the range between them is connected by a straight line, thereby obtaining a trapezoidal weight. The trapezoidal weight function can become one of the solving methods on the assumption that the influence on the fluctuation of the position sensitivity is ignored and it is only an object to eliminate the stairway which is caused at the switching boundary. Further, like a weight function as shown in FIG. 21, it is also possible to use a weight function such that the weight at the center O serving as a track center is set to 1, the weight at a position near the switching boundary of the position information PosN and PosQ is set to 0.5, and the range between them is connected by a curve. For example, a sine curve is used as a curve in such a case. The position demodulating method of the invention for calculating the decoded position by synthesizing the two position information Pos1 and Pos2 in which the influences of the fluctuation of the position sensitivity appear oppositely by using the weight gain is applied to the actual magnetic disk apparatus and experiments are performed. Results of the experiments are shown below.

Figure 9:
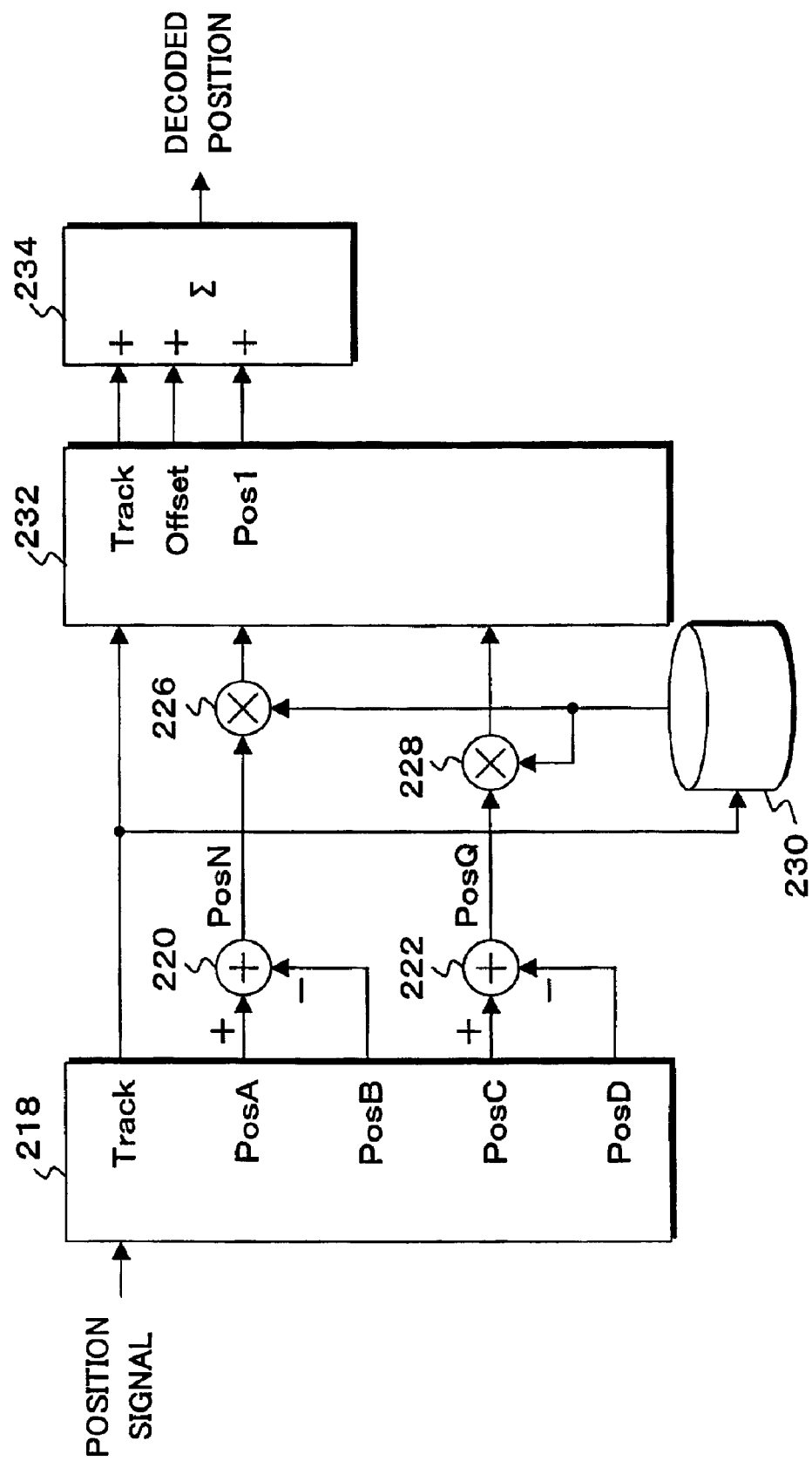
FIG. 9 is a block diagram of a conventional position demodulating circuit.
Figure 22A:
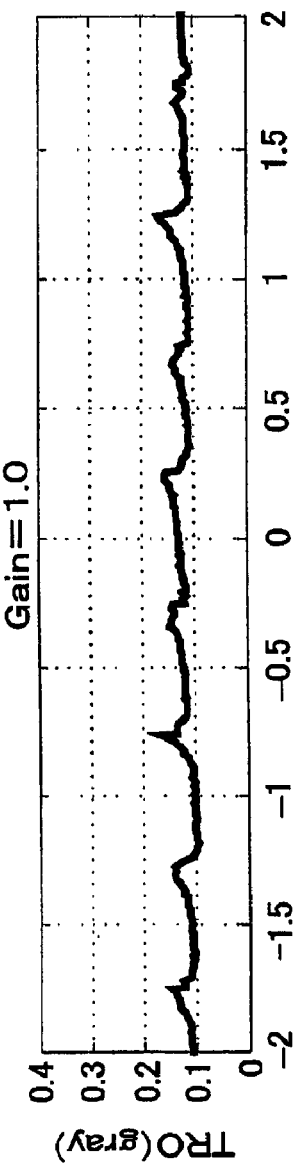
FIGS. 22A to 22C are explanatory diagrams of measurement results of positioning precision with respect to a change in position sensitivity gain by a conventional position demodulation.
Figure 22B:
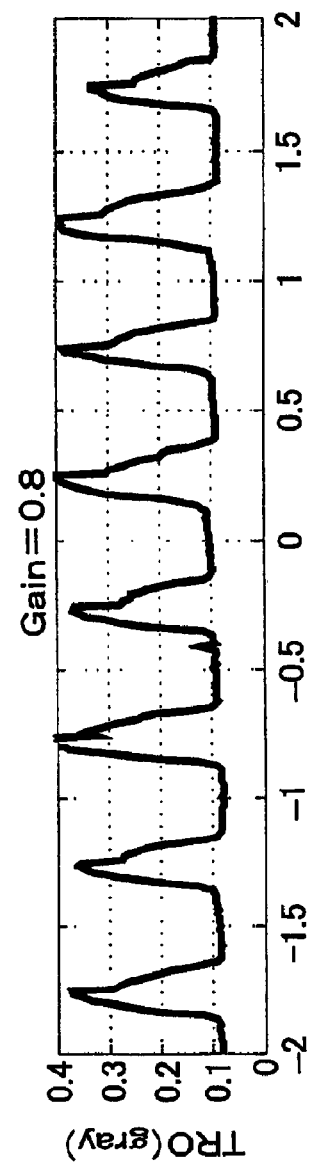
Figure 22C:
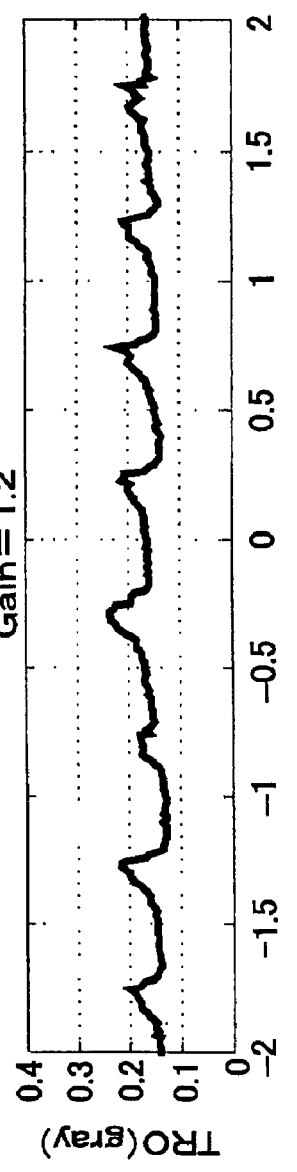

FIGS. 22A to 22C show demodulation results of the conventional position demodulating method which is realized by the block diagram of FIG. 9. FIG. 22A shows the case where the measurement value itself is used as a position sensitivity gain. FIG. 22B shows the case where the measurement value of the position sensitivity gain is reduced to 80%. FIG. 22C shows the case where the measurement value of the position sensitivity gain is increased to 120%. An axis of abscissa indicates the offset. An axis of ordinate shows the positioning precision (TRO). In the measurement, the positioning precision is measured while finely changing the offset by deviating the positioning target little by little. With respect to the disk used for the measurement, the value obtained by multiplying the track number (gray number) recorded on the disk by ⅔ indicates the number of the track which is actually read/written. Therefore, the measurement result uses the gray number as a unit. According to the conventional position demodulating method, since the measurement value itself of the position sensitivity gain has the error from the beginning, also with respect to the measurement value itself in FIG. 22A, the positioning precision at a position of ±0.5 for an integer showing the track number indicative of a place near the boundary of the position information PosN and PosQ deteriorates. On the other hand, the positioning precision at a position near the switching boundary of the position information PosN and PosQ largely deteriorates in association with the fluctuation of ±20% of the measurement values of the position sensitivity gain in FIGS. 22B and 22C. Further, also at a position of the offset 0, the positioning precision changes largely in association with the fluctuation of the position sensitivity gain. As mentioned above, the conventional position demodulating method can be regarded as a demodulating method which is weak against the fluctuation of the position sensitivity gain. Since the measurement results in FIGS. 22A to 22C are the results obtained by constructing a closed loop control system by a compensator, the fluctuation of the position sensitivity gain causes a change in size of measuring position and causes a change in closed loop gain. It should to be noted, therefore, to a point that even when the position sensitivity gain is changed by +20%, the result is not always increased by +20%.

Figure 23A:
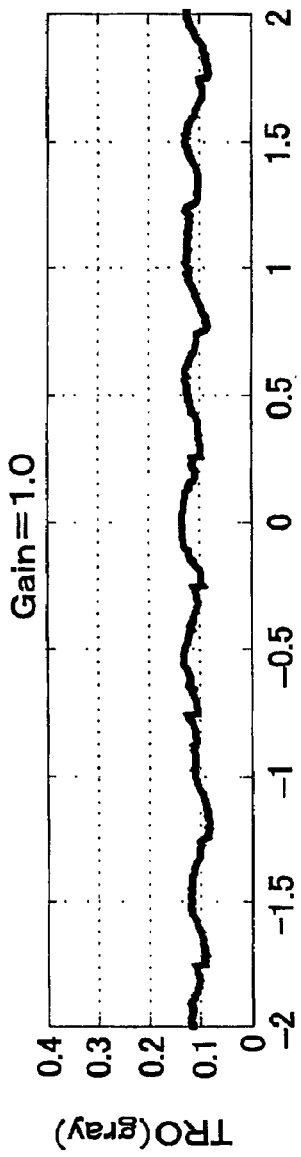
FIGS. 23A to 23C are explanatory diagrams of measurement results of positioning precision with respect to a change in position sensitivity gain according to the position demodulation of the invention using the triangular weight function in which the lower limit value is set to 0.5 in FIG. 18.
Figure 23B:
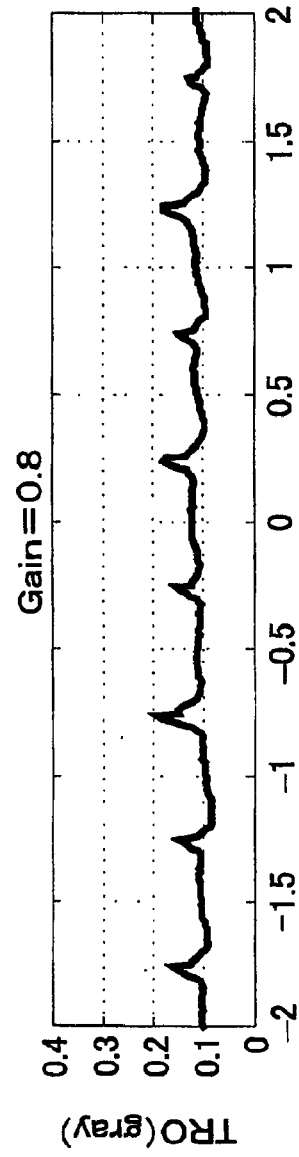
Figure 23C:
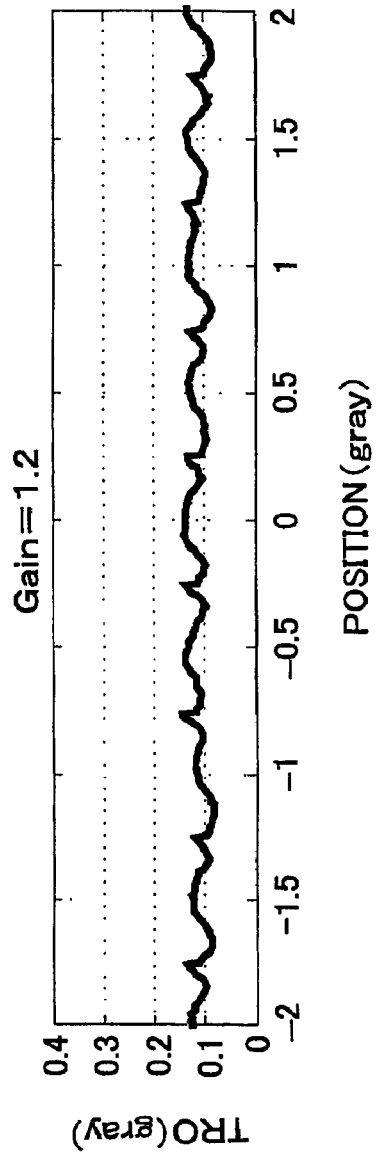

FIGS. 23A to 23C show results obtained by performing the synthesis demodulation of the position information PosN and PosQ according to the invention by using the weight function which has a triangular wave shown in FIG. 18 and whose lower limit value is restricted to 0.5. The apparatus, circuit, and control method used for the measurement of the synthesis demodulation are substantially the same as those in the conventional demodulating method of FIGS. 22A to 22C except that only demodulating calculations are different.

FIG. 23A shows the measurement value itself of the position sensitivity gain. FIG. 23B shows the measurement result obtained in the case where the measurement value itself of the position sensitivity gain is set to 80% by changing it by −20%. FIG. 23C shows the measurement result obtained in the case where it is set to 120% by changing it by +20%. In FIGS. 23A to 23C, it will be understood that if the position sensitivity gain in FIG. 23A is the measurement value itself, the positioning precision at a position near the switching boundary of the position information PosN and PosQ is improved as compared with that in the conventional demodulating method of FIG. 22B.

It will be understood that even if the position sensitivity gain is changed by ±20% from the measurement value as shown in FIGS. 23B and 23C, the positioning precision at a position near the offset 0 hardly changes as well as the positioning precision at a position near the switching boundary of the position information PosN and PosQ. It has been confirmed from the test results that the position demodulating method of low sensitivity against the fluctuation of the position sensitivity gain is realized by using the triangular weight function whose lower limit value is restricted to 0.5 as mentioned above.

Figure 24A:
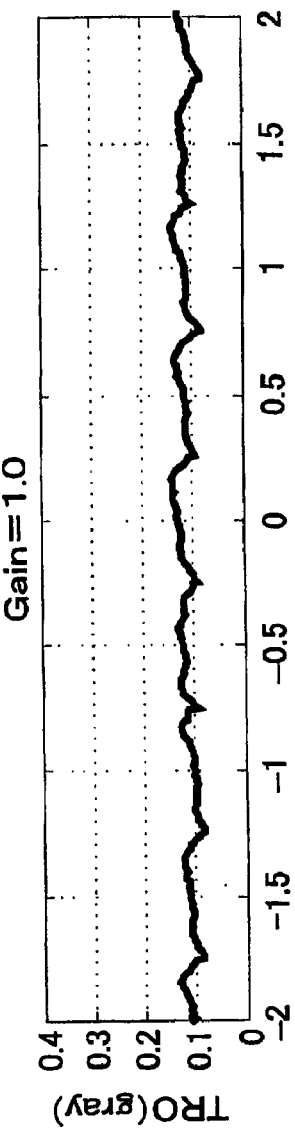
FIGS. 24A to 24C are explanatory diagrams of measurement results of positioning precision with respect to a change in position sensitivity gain according to the position demodulation of the invention using the trapezoidal weight function in FIG. 20.
Figure 24B:
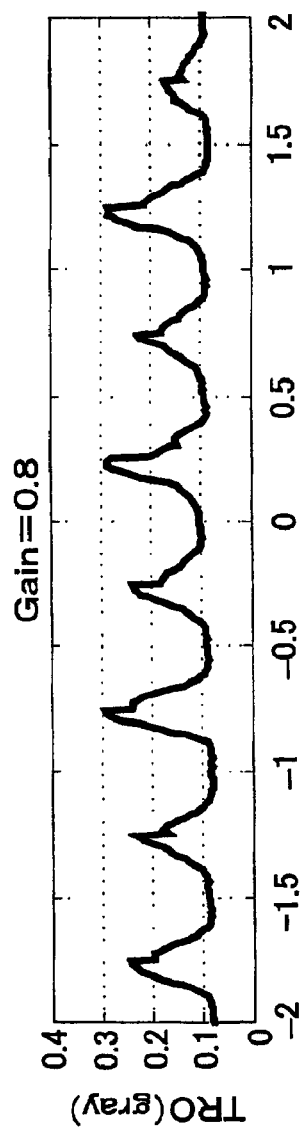
Figure 24C:
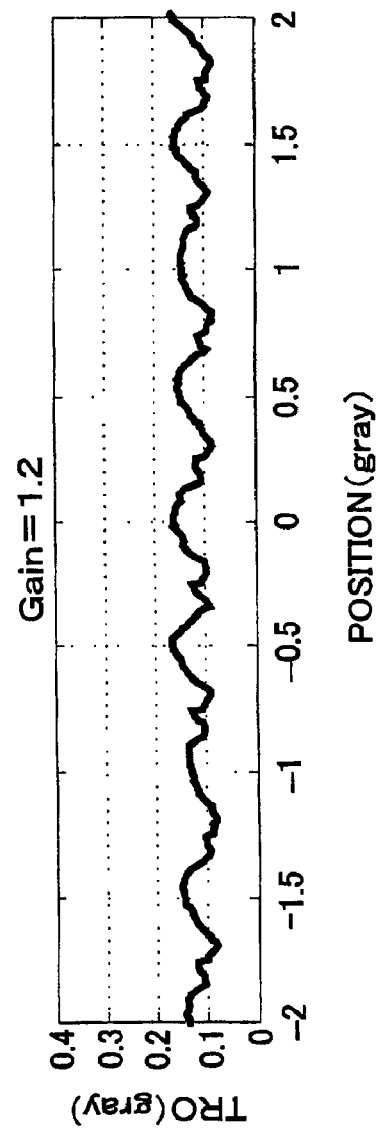

FIGS. 24A to 24C show measurement results obtained by the position demodulating method of the invention in the case where the trapezoidal weight function of FIG. 20 is used. Also in this case, it will be understood that when the trapezoidal weight function is used, the positioning precision at a position near ±0.5 for the track number corresponding to a place near the switching boundary of the position information PosN and PosQ is smaller than those in FIGS. 22B and 22C even if the position sensitivity gain is fluctuated by ±20% as shown in FIGS. 24B and 24C, and the positioning precision is improved. However, in case of using the trapezoidal weight function, although the positioning precision at the offset 0 is subjected to the fluctuation of the position sensitivity gain, it will be understood that the positioning precision has been improved as compared with those in the conventional demodulating methods of FIGS. 22B and 22C.

A compression demodulation including error information in the position calculating circuit 66 provided in the second circuit unit 50 in FIG. 14 will now be explained. As shown in the demodulation tables of FIGS. 6 and 7 according to the conventional demodulating methods, it is necessary to consider an error state at the time of the position demodulation. It is now obtained as a logical compressing method adapted to the position demodulating method of the invention. The position signals PosA, PosB, PosC, and PosD correspond to area values of the burst signals obtained by the AD converter. Gsns denotes a position sensitivity gain at a position near the present position. Further, M(x) denotes a weight function regarding the absolute value x. As shown in FIG. 6, with respect to each interval shown by segment numbers 1 to 8, the position information PosN and PosQ are compared and the position information of the smaller absolute value is calculated in the manner similar to that of the table of FIG. 6. With respect to the position information of the larger absolute value, calculation values are formed in accordance with the position information of the smaller absolute value. That is, a calculating expression is constructed every one of eight kinds of segments shown in FIG. 25 by using the PosN, PosQ, and gray number shown in the conventional demodulating method of FIG. 6. It is sufficient that calculating expressions of the position information of the larger absolute value are obtained together in the demodulation table in the normal case where the gray number is correct. When the table of FIG. 25 is logically compressed and the demodulating expressions are formed as a program of the C language, they can be expressed as follows. In this program, although the portions using Gray+offset and Pos1 are the same as those in the program of the conventional demodulating method, it differs with respect to a point that the expressions using Pos2 are added and the weight function is referred to at Pos1.

$PosN=Gsns*(PosA-PosB);$ $PosQ=Gsns*(PosC-PosD);$

Track=Gray;
Position=Tack;

```
if(abs(PosN) ≦ abs(PosQ)){
    Pos1 = -sgn(PosQ)*PosN;
    if(sgn(PosQ)*even(Track)>0.0)
        Position += sgn(PosQ)*sgn(PosN)*1.0
    Pos2 = -sgn(PosQ)*(PosN+sgn(PosQ)*0.5);
} else {
    Pos1 = sgn(PosN)*PosQ;
    Position = sgn(PosN)*even(Track)*0.5 + Track;
    Pos2 = sgn(PosN)*(PosQ-sgn(PosQ)*0.5);
}
G1 = M(Pos1);
G2 = 1 - G1;
Position += G1*Pos1 + G2*Pos2;
```

In this program, the function M(x) denotes a weight function. For example, the triangular weight function M(x) whose lower limit value is set to 0.5 and which is shown in FIG. 18 can be expressed by the following program.

```
float M(float x)
{
    fload data;
    if(x < 0)
        data = 2*x+1;
    else
        data = -2*+1;
    if(x < 0.5)x = 0.5;
    else if(x > 1.0)x = 1.0;
    return data;
}
```

Although the program for obtaining the triangular weight function relates to the case where a reading track and a writing track have the same track width on the disk, if the width of writing track is ½ times as large as that of the reading track on the disk, it is sufficient to multiply the value of the weight gain obtained as mentioned above by ⅔.

A position demodulating method which takes into consideration of the speed offset in the invention will now be described. According to the position demodulating method of the invention shown in the block diagram of FIG. 14, in the following control for allowing the head to trace the target track the position demodulation in the case where the speed of the head, that is, the speed of the actuator is set to 0 is considered as a target. On the other hand, the speed correction is necessary with respect to the case where the head speed during the seeking operation in which the head is being moved to the target position by the driving of the actuator is not equal to 0.

Figure 26:
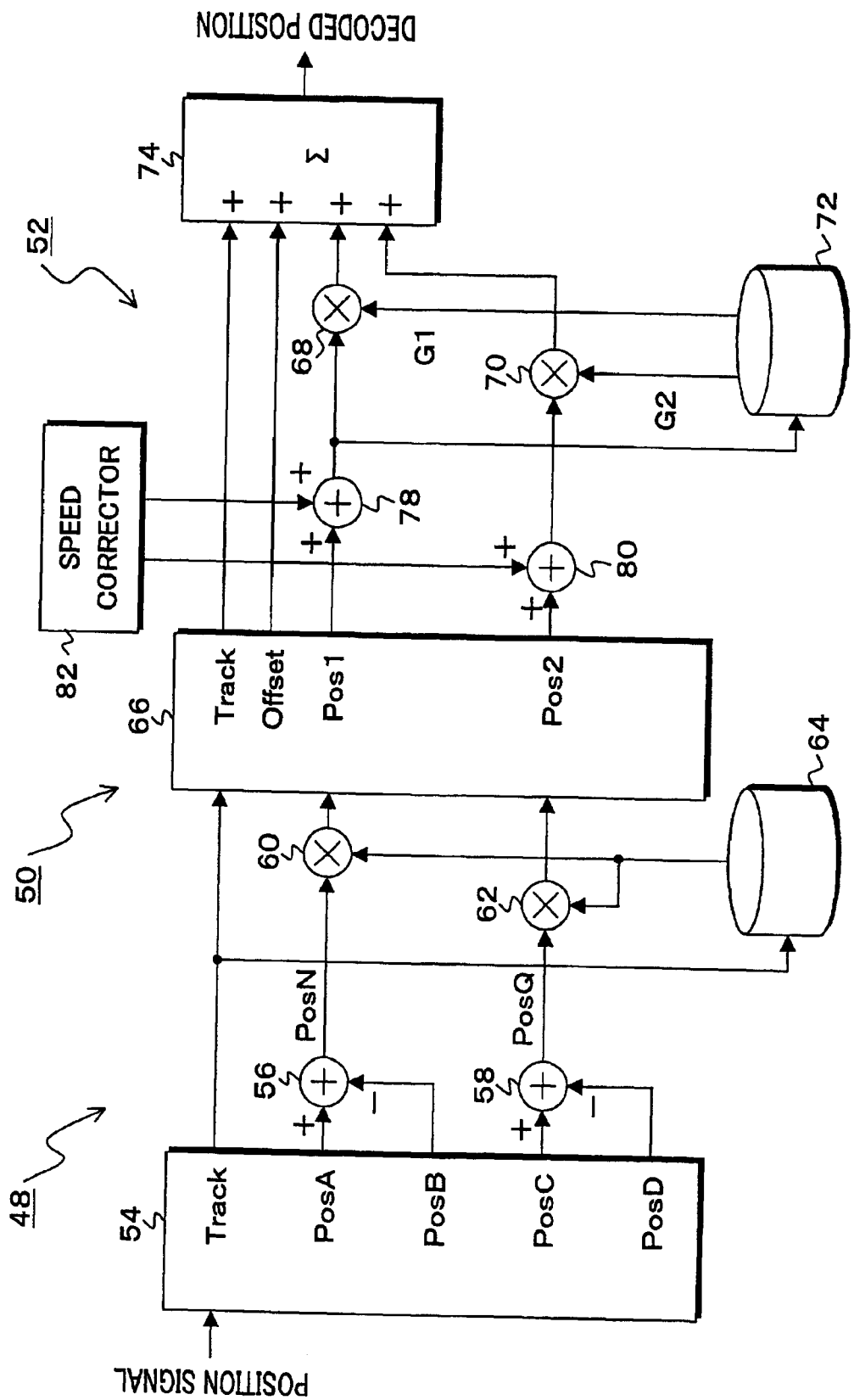
FIG. 26 is a block diagram of a demodulating circuit of the invention for correcting a speed offset.

FIG. 26 is a functional block diagram of the position demodulating method of the invention which takes into consideration the speed offset. In FIG. 26, although the constructions of the first circuit unit 48, second circuit unit 50, and third circuit unit 52 in the position detecting circuit are substantially the same as those in FIG. 14, in order to correct the speed offset, adders 78 and 80 are further newly provided for the position information Pos1 and Pos2 outputted from the position calculating circuit 66 in the second circuit unit 52, and the speed offset obtained by a speed corrector 82 is added to the adders 78 and 80. The speed offset which is calculated by the speed corrector 82 is obtained as follows.

Speed offset=(speed gain)×(speed predictive value at that point of time)

The speed gain here is set to a different value for each of the PosN and PosQ. Specifically speaking, (Speed gain of *PosN*)=*T*1/*Ts*

(Speed gain of *PosQ*)=*T*2/*Ts* where,

Ts: sampling period

Figure 1:
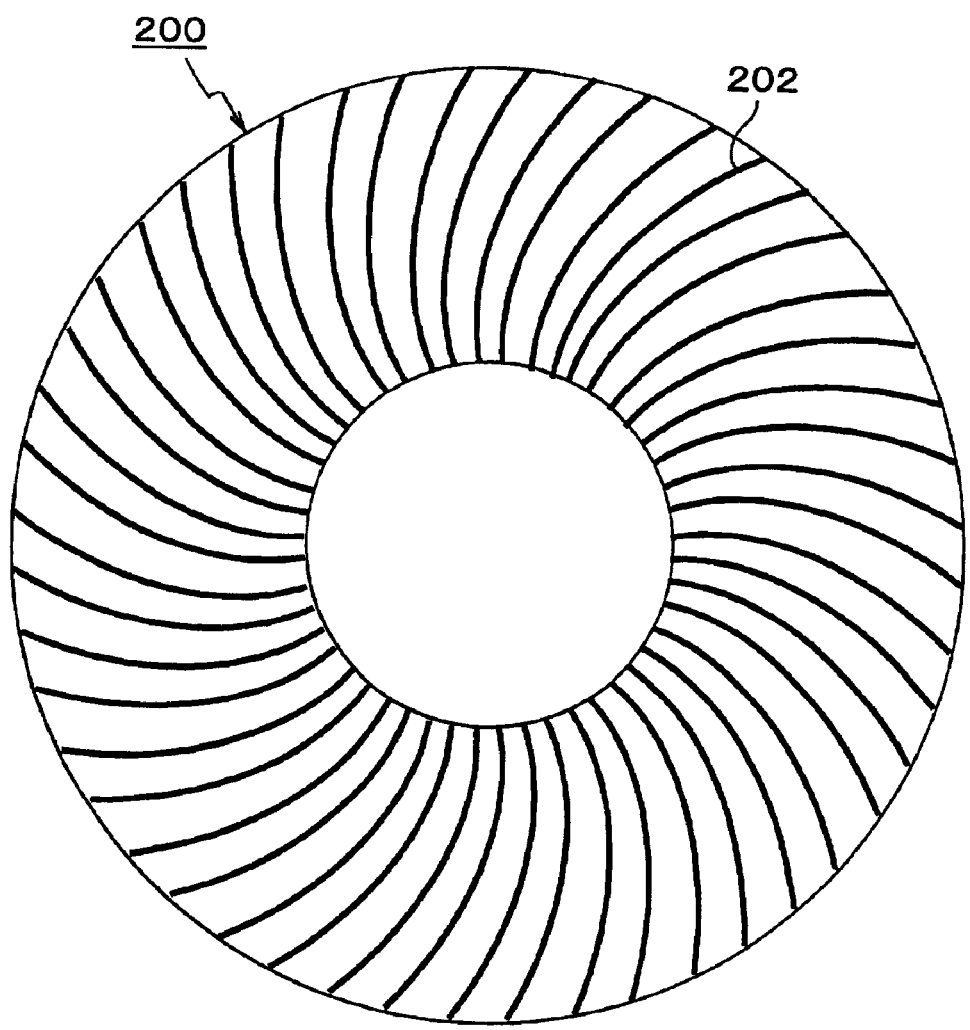
FIG. 1 is an explanatory diagram of an arrangement of position signals on a disk.
Figure 2:
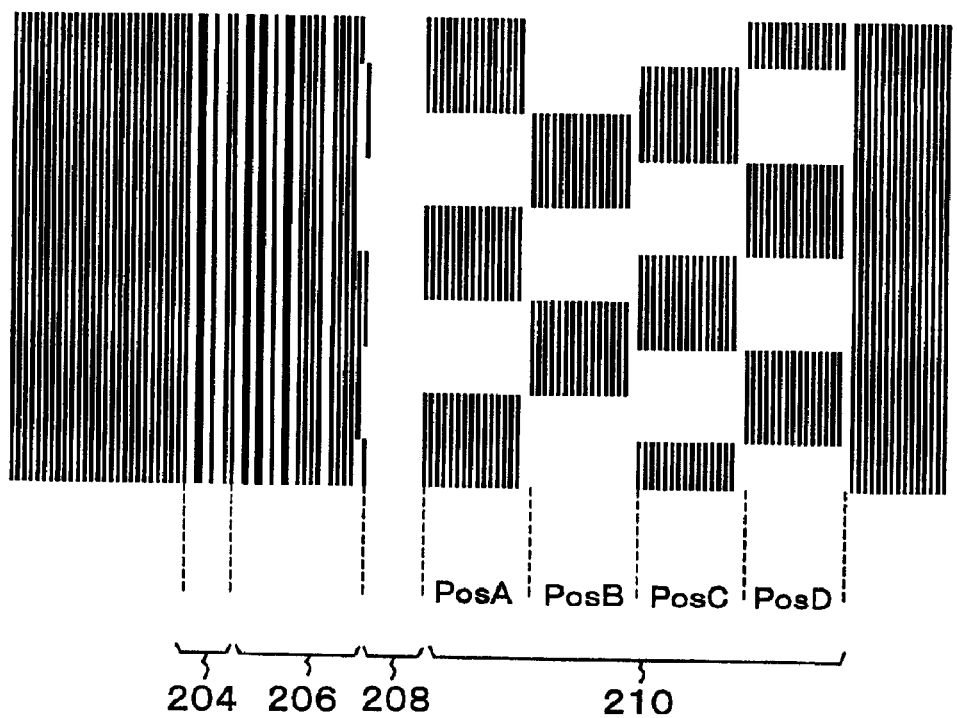
FIG. 2 is an explanatory diagram of position signal patterns which were magnetically recorded on the disk.
Figure 3:
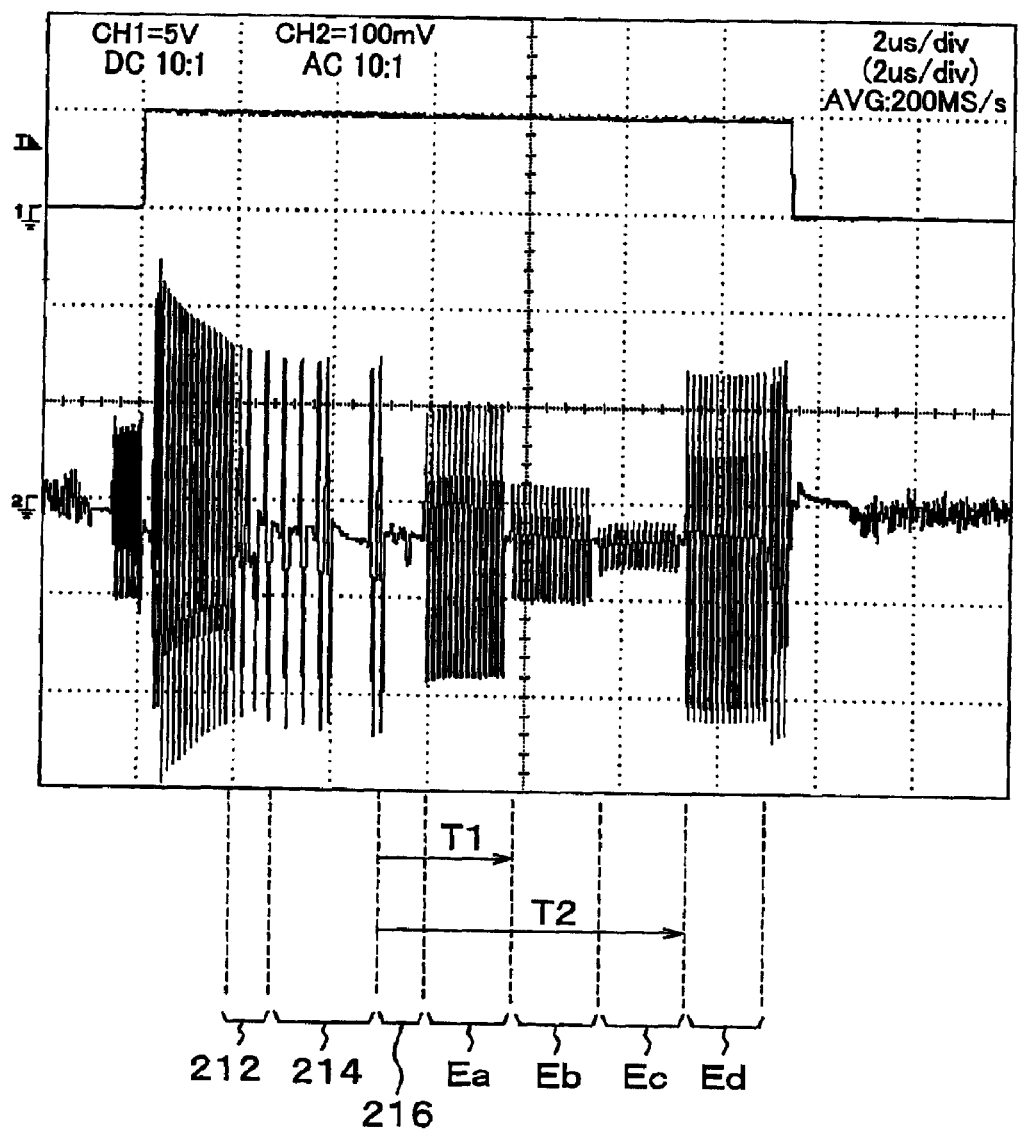
FIG. 3 is an explanatory diagram of position signal waveforms read out by a head.

T1: time interval from an index signal 216 to a point between the burst signals Ea and Eb shown in FIG. 3

T2: time interval from the index signal 216 to a point between the burst signals Ec and Ed shown in FIG. 3

Further, the speed predictive value Vel at that point of time which is multiplied to the speed gain in order to obtain the speed offset is a seek speed which is obtained by the observer control. The demodulating calculation which takes into consideration the speed offset has been proposed in Japanese Patent Application No. 2000-063845 of the same applicant as the present invention. When the position demodulating method of the invention which takes into consideration the speed offset as mentioned above is expressed by the C program, it will be as follows. The maximum speed for preventing the positional relation of PosN and PosQ from being reversed is assumed to be VelMAX.

*PosN=Gsns\*(PosA−PosB)*;

*PosQ=Gsns\*(PosC−PosD)*;

Track=Gray;
Position=Track;

```
If (abs(Vel) ≦ MAX_VEL){
    if(abs(PosN) ≦ abs(PosQ)){
        PosOfs = −sgn(PosQ)*PosN + Vel*T1/Ts;
        if(sgn(PosQ)*even(Track)>0.0)
            Position += sgn(PosQ)*sgn(PosN)*1.0;
        PosOfs2 = −sgn(PosQ)*(PosN+sgn(PosQ)*0.5) + Vel*T2/Ts;
    } else {
        PosOfs = sgn(PosN)*PosQ PosN + Vel*T2/Ts;
        Position = sgn(PosN)*even(Track)*0.5 + Track;
        PosOfs2 = sgn(PosN)*(PosN−sgn(PosQ)*0.5) + Vel*T1/Ts
    }
    G1 = M(PosOfs);
    G2 = 1-G1;
    Position += G1*PosOfs + G2*PosOfs2;
}
```

Figure 27:
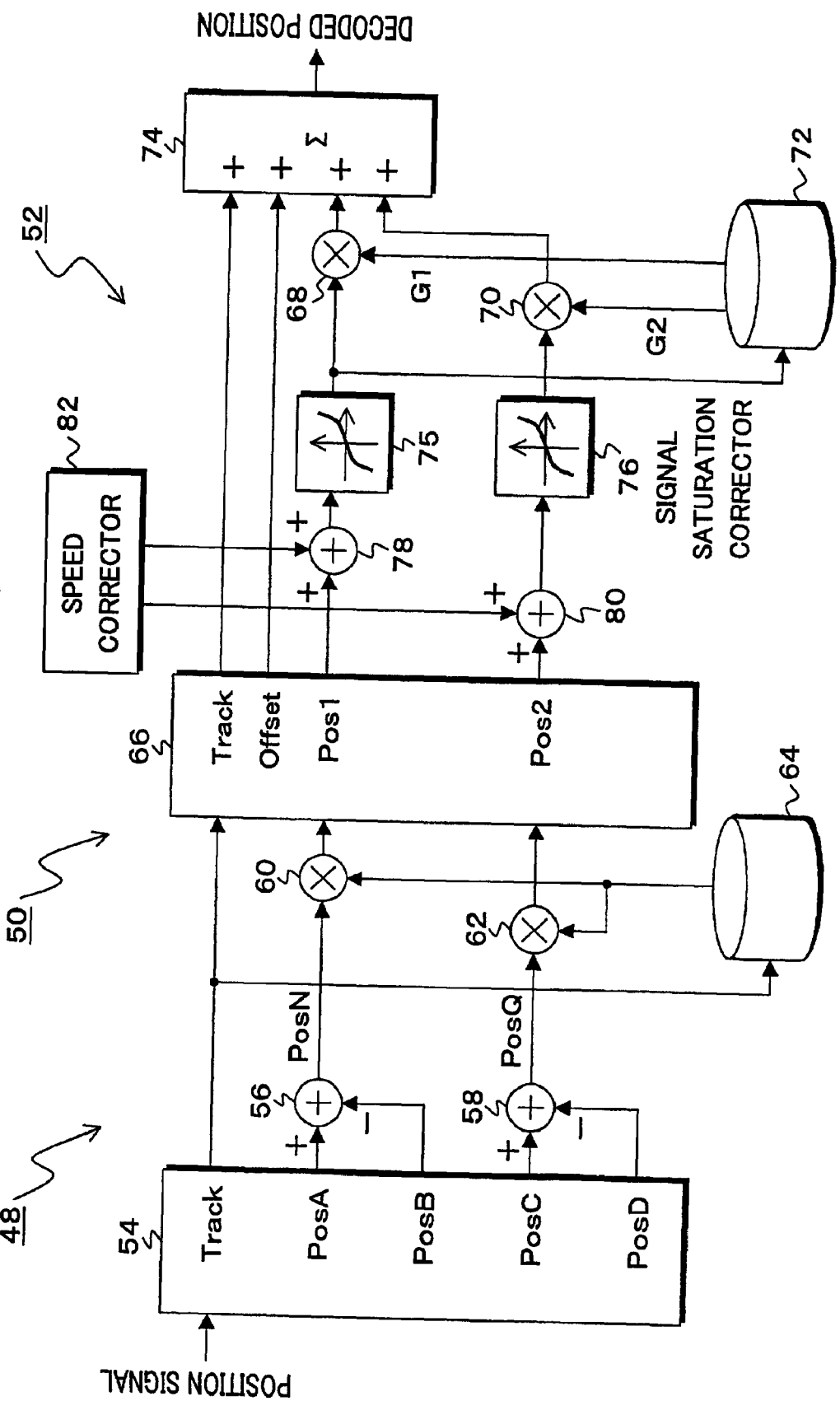
FIG. 27 is a block diagram of the demodulating circuit of the invention for making the saturation correction and the speed offset correction.

FIG. 27 is a block diagram of a functional construction of an embodiment in which the demodulation is performed in consideration of the speed offset with respect to the embodiment using the signal saturation corrector of FIG. 19. In the embodiment, with respect to each of the position information Pos1 and Pos2 from the position calculating circuit 66 provided in the second circuit unit 50, the correction of the speed offset is newly made by the adder 80 and speed corrector 82, subsequently, signal saturation correctors 75 and 76 are provided, and saturating portions are corrected with regard to both of the position information Pos1 and Pos2, thereby avoiding the influence of the saturation. For this purpose, the correct weight gain is read out with reference to the weight function file 72 on the basis of the position information Pos1 whose saturation has been started by the signal saturation corrector 75 and multiplied by the multipliers 68 and 70, thereby enabling the synthesis demodulation to be more accurately performed. Further, in any of the demodulating processes, the correction of a nonlinear gain for the offset is the same as the conventional one. In case of adding the demodulation which takes into consideration the speed offset to the position demodulating method of the invention, any special process is not needed but it is sufficient to simply add such demodulation.

As mentioned above, according to the invention, the detection error of the position in association with the error of the position sensitivity gain is suppressed to the minimum limit and, at the same time, the demodulation error at a place near the switching boundary of the position information PosN and PosQ is avoided, and the stairway can be avoided. Thus, the more accurate position detection and positioning precision in the disk apparatus can be realized.

Although the above embodiment has been described with respect to the apparatus in which the disk is always rotated at a constant rotational speed as an example, similar effects can be also obtained in an apparatus in which a value of the rotation of the disk is changed in accordance with the position of the head. Although the embodiment has been described on the assumption that the tracks recorded on the disk are the same as those for recording and reproducing data, it is also possible to multiply the number of tracks on the disk by $\frac{2}{3}$ and use them as tracks for recording and reproducing data. Although the above embodiment has been described on the assumption that

*PosN=PosA−PosB*

*PosQ=PosC−PosD,* the recording order of the signals is not restricted to it. For example, it can be also set to an order

*PosN=PosA−PosC*

*PosQ=PosB−PosD,* or an order

*PosN=PosA−PosD*

*PosQ=PosB−PosC.*

On the other hand, it is also possible to normalize the position information as follows

*PosN=(PosA−PosB)/(PosA+PosB)*

*PosQ=(PosC−PosD)/(PosC+PosD),* and subsequently use them.

Further, the present invention incorporates many proper modifications which can accomplish the object and advantages of the invention and is not restricted by the numerical values shown in the above embodiment.

What is claimed is:

1. A position demodulating method of a disk apparatus, for calculating a decoded position after position signals of a disk read by a head were demodulated, comprising:
   a first step wherein after position information of different phases are demodulated from said position signals, they are multiplied by a position sensitivity gain, respectively, and first position information PosN and second position information PosQ are calculated;
   a second step wherein said first position information PosN and said second position information PosQ are compared and third position information Pos1 and fourth position information Pos2 in which influences of an error of the position sensitivity gain appear oppositely are calculated; and a third step wherein a first weight gain G1 and a second weight gain G2 are obtained from said third position information Pos1 and said decoded position is calculated by including an addition value of a multiplication value obtained by multiplying said third position information by said first weight gain and a multiplication value obtained by multiplying said fourth position information by said second weight gain;

wherein said first weight gain is a segment primary function which changes like a triangle for a detected position so as to be equal to 1 at a track center and 0 at track boundary positions on both sides.

2. A position demodulating method of a disk apparatus, for calculating a decoded position after position signals of a disk read by a head were demodulated, comprising:

a first step wherein after position information of different phases are demodulated from said position signals, they are multiplied by a position sensitivity gain, respectively, and first position information PosN and second position information PosQ are calculated;

a second step wherein said first position information PosN and said second position information PosQ are compared and third position information Pos1 and fourth position information Pos2 in which influences of an error of the position sensitivity gain appear oppositely are calculated; and a third step wherein a first weight gain G1 and a second weight gain G2 are obtained from said third position information Pos1 and said decoded position is calculated by including an addition value of a multiplication value obtained by multiplying said third position information by said first weight gain and a multiplication value obtained by multiplying said fourth position information by said second weight gain;

wherein said first weight gain is a segment primary function which changes like a triangle for a detected position which is set to 1 at a track center and which is restricted to a lower limit value 0.5 at a position near a switching position of said position information PosN and PosQ on both sides.

3. A position demodulating method of a disk apparatus, for calculating a decoded position after position signals of a disk read by a head were demodulated, comprising:

a first step wherein after position information of different phases are demodulated from said position signals, they are multiplied by a position sensitivity gain, respectively, and first position information PosN and second position information PosQ are calculated;

a second step wherein said first position information PosN and said second position information PosQ are compared and third position information Pos1 and fourth position information Pos2 in which influences of an error of the position sensitivity gain appear oppositely are calculated; and a third step wherein a first weight gain G1 and a second weight gain G2 are obtained from said third position information Pos1 and said decoded position is calculated by including an addition value of a multiplication value obtained by multiplying said third position information by said first weight gain and a multiplication value obtained by multiplying said fourth position information by said second weight gain;

wherein said first weight gain is a segment primary function which changes like a trapezoid for a detected position which is set to 1 at a position in front of a switching position of said position information PosN and PosQ on both sides from a track center and which is restricted to a lower limit value 0.5 at a position near said switching position.

4. A position demodulating method of a disk apparatus, for calculating a decoded position after position signals of a disk read by a head were demodulated, comprising:

a first step wherein after position information of different phases are demodulated from said position signals, they are multiplied by a position sensitivity gain, respectively, and first position information PosN and second position information PosQ are calculated;

a second step wherein said first position information PosN and said second position information PosQ are compared and third position information Pos1 and fourth position information Pos2 in which influences of an error of the position sensitivity gain appear oppositely are calculated; and a third step wherein a first weight gain G1 and a second weight gain G2 are obtained from said third position information Pos1 and said decoded position is calculated by including an addition value of a multiplication value obtained by multiplying said third position information by said first weight gain and a multiplication value obtained by multiplying said fourth position information by said second weight gain;

wherein said first weight gain is a curve function which changes for a detected position which is set to 1 at a position in front of a switching position of said position information PosN and PosQ on both sides from a track center and which is restricted to a lower limit value 0.5 at a position near said switching position.

5. A method according to claim 2, wherein said first weight gain is determined with reference to said segment primary function by said third position information in which saturation characteristics have been corrected.

6. A method as in claim 1, 2, 3 or 4, wherein with respect to said first weight gain, said second weight gain is set to a value obtained by subtracting the first weight gain from 1.

7. A method as in claim 1, 2, 3 or 4, wherein in said second step, a first speed correcting position and a second speed correcting position which are proportional to a moving speed of the head are obtained every said third position information Pos1 and said fourth position information Pos2 and added.

8. A position demodulating circuit of a disk apparatus, for calculating a decoded position after position signals of a disk read by a head were demodulated, comprising:

a first circuit unit which demodulates position information of different phases from said position signals, subsequently multiplies said position information by a position sensitivity gain, respectively, and calculates first position information PosN and second position information PosQ;

a second circuit unit which compares said first position information PosN with said second position information PosQ and calculates third position information Pos1 and fourth position information Pos2 in which influences of an error of the position sensitivity gain appear oppositely; and a third circuit unit which obtains a first weight gain and a second weight gain from said third position information Pos1 and calculates said decoded position by including an addition value of a multiplication value obtained by multiplying said third position information by said first weight gain and a multiplication value obtained by multiplying said fourth position information by said second weight gain;

wherein said first weight gain is a segment primary function which changes like a triangle for a detected position so as to be equal to 1 at a track center and 0 at track boundary positions on both sides.

9. A position demodulating circuit of a disk apparatus, for calculating a decoded position after position signals of a disk read by a head were demodulated, comprising:

a first circuit unit which demodulates position information of different phases from said position signals, subsequently multiplies said position information by a position sensitivity gain, respectively, and calculates first position information PosN and second position information PosQ;

a second circuit unit which compares said first position information PosN with said second position information PosQ and calculates third position information Pos1 and fourth position information Pos2 in which influences of an error of the position sensitivity gain appear oppositely; and a third circuit unit which obtains a first weight gain and a second weight gain from said third position information Pos1 and calculates said decoded position by including an addition value of a multiplication value obtained by multiplying said third position information by said first weight gain and a multiplication value obtained by multiplying said fourth position information by said second weight gain;

wherein said first weight gain is a segment primary function which changes like a triangle for a detected position which is set to 1 at a track center and which is restricted to a lower limit value 0.5 at a position near a switching position of said position information PosN and PosQ on both sides.

10. A position demodulating circuit of a disk apparatus, for calculating a decoded position after position signals of a disk read by a head were demodulated, comprising:

a first circuit unit which demodulates position information of different phases from said position signals, subsequently multiplies said position information by a position sensitivity gain, respectively, and calculates first position information PosN and second position information PosQ;

a second circuit unit which compares said first position information PosN with said second position information PosQ and calculates third position information Pos1 and fourth position information Pos2 in which influences of an error of the position sensitivity gain appear oppositely; and a third circuit unit which obtains a first weight gain and a second weight gain from said third position information Pos1 and calculates said decoded position by including an addition value of a multiplication value obtained by multiplying said third position information by said first weight gain and a multiplication value obtained by multiplying said fourth position information by said second weight gain;

wherein said first weight gain is a segment primary function which changes like a trapezoid for a detected position which is set to 1 at a position in front of a switching position of said position information PosN and PosQ on both sides from a track center and which is restricted to a lower limit value 0.5 at a position near said switching position.

11. A position demodulating circuit of a disk apparatus, for calculating a decoded position after position signals of a disk read by a head were demodulated, comprising:

a first circuit unit which demodulates position information of different phases from said position signals, subsequently multiplies said position information by a position sensitivity gain, respectively, and calculates first position information PosN and second position information PosQ;

a second circuit unit which compares said first position information PosN with said second position information PosQ and calculates third position information Pos1 and fourth position information Pos2 in which influences of an error of the position sensitivity gain appear oppositely; and a third circuit unit which obtains a first weight gain and a second weight gain from said third position information Pos1 and calculates said decoded position by including an addition value of a multiplication value obtained by multiplying said third position information by said first weight gain and a multiplication value obtained by multiplying said fourth position information by said second weight gain;

wherein said first weight gain is a curve function which changes for a detected position which is set to 1 at a position in front of a switching position of said position information PosN and PosQ on both sides from a track center and which is restricted to a lower limit value 0.5 at a position near said switching position.

12. A circuit according to claim 11, wherein said first weight gain is determined with reference to said segment primary function by said third position information in which saturation characteristics have been corrected.

13. A circuit in claim 8, 9, 10 or 11, wherein said second circuit unit obtains a first speed correcting position and a second speed correcting position which are proportional to a moving speed of the head every said third position information Pos1 and said fourth position information Pos2 and adds them.

14. A circuit as in claim 8, 9, 10 or 11, wherein with respect to said first weight gain, said second weight gain is set to a value obtained by subtracting the first weight gain from 1.

* * * * *